US012176620B2

(12) United States Patent
Lee et al.

(10) Patent No.: US 12,176,620 B2
(45) Date of Patent: Dec. 24, 2024

(54) ANTENNA DEVICE AND ELECTRONIC DEVICE INCLUDING THE SAME

(71) Applicant: SAMSUNG ELECTRONICS CO., LTD., Suwon-si (KR)

(72) Inventors: Juneseok Lee, Suwon-si (KR); Jinsu Heo, Suwon-si (KR); Youngsub Kim, Suwon-si (KR); Jungho Park, Suwon-si (KR); Kwanghyun Baek, Suwon-si (KR); Youngju Lee, Suwon-si (KR); Kyoungho Jeong, Suwon-si (KR); Dohyuk Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 17/496,326

(22) Filed: Oct. 7, 2021

(65) Prior Publication Data

US 2022/0109249 A1 Apr. 7, 2022

Related U.S. Application Data

(63) Continuation of application No. PCT/KR2021/013784, filed on Oct. 7, 2021.

(30) Foreign Application Priority Data

Oct. 7, 2020 (KR) ........................ 10-2020-0129159
Apr. 30, 2021 (KR) ........................ 10-2021-0056285

(51) Int. Cl.
*H01Q 21/06* (2006.01)
*H01Q 1/24* (2006.01)
*H01Q 9/04* (2006.01)

(52) U.S. Cl.
CPC ........... *H01Q 21/065* (2013.01); *H01Q 1/243* (2013.01); *H01Q 9/0414* (2013.01); *H01Q 9/045* (2013.01)

(58) Field of Classification Search
CPC ...... H01Q 21/065; H01Q 21/08; H01Q 1/243; H01Q 1/38; H01Q 1/523; H01Q 9/0414;
(Continued)

(56) References Cited

U.S. PATENT DOCUMENTS 6,633,262 B1 10/2003 Shoji et al.
2007/0069960 A1 * 3/2007 Moon .................... H01Q 1/523
343/700 MS (Continued)

FOREIGN PATENT DOCUMENTS

KR 10-0699472 3/2007
KR 10-2015-0032972 4/2015

(Continued)

OTHER PUBLICATIONS

International Search Report and Written Opinion dated Jan. 11, 2022 in corresponding International Application No. PCT/KR2021/013784.

(Continued)

*Primary Examiner* — Seokjin Kim
(74) *Attorney, Agent, or Firm* — Nixon & Vanderhye, P.C.

(57) ABSTRACT

According to various embodiments of the disclosure, an antenna device comprises: a first antenna array including an array of a plurality of first radiation patches, a communication circuit configured to transmit and/or receive a radio signal using at least one of the first radiation patches, and at least one first isolator comprising a conductor disposed in an area between two adjacent first radiation patches among the first radiation patches. The first isolator may include a first portion, a second portion disposed in parallel with the first portion, and a third portion electrically connecting the first portion with the second portion. The first portion and the second portion may be configured to generate current flows
(Continued)

having a phase difference of 180 degrees with respect to each other.

19 Claims, 17 Drawing Sheets

(58) Field of Classification Search
CPC .......... H01Q 9/045; H01Q 9/04; H01Q 9/065; H01Q 9/0407; H01Q 3/30; H01Q 25/00
See application file for complete search history.

(56) References Cited

U.S. PATENT DOCUMENTS

| | | | | |
|---|---|---|---|---|
| 2010/0053022 | A1 | 3/2010 | Mak et al. | |
| 2010/0201465 | A1 | 8/2010 | McKinzie, III | |
| 2012/0190296 | A1 | 7/2012 | Sarabandi et al. | |
| 2015/0126139 | A1 | 5/2015 | Chen et al. | |
| 2016/0211586 | A1* | 7/2016 | Hong | H01Q 1/521 |
| 2019/0098750 | A1* | 3/2019 | Woo | H01Q 9/045 |
| 2020/0411954 | A1* | 12/2020 | Jia | H01Q 5/0026 |
| 2023/0246326 | A1 | 8/2023 | Woo et al. | |

FOREIGN PATENT DOCUMENTS

| | | |
|---|---|---|
| KR | 10-2017-0082838 | 7/2017 |
| KR | 10-2019-0027097 | 3/2019 |

OTHER PUBLICATIONS

Extended Search Report dated Jan. 18, 2024 in European Patent Application No. 21878020.3.
Office Action dated Aug. 30, 2024 in U.S. Appl. No. 18/399,837.

* cited by examiner

ANTENNA DEVICE AND ELECTRONIC DEVICE INCLUDING THE SAME

CROSS-REFERENCE TO RELATED APPLICATIONS

This application is a continuation of International Application No. PCT/KR2021/013784 designating the United States, filed on Oct. 7, 2021, in the Korean Intellectual Property Receiving Office and claiming priority to Korean Patent Application No. 10-2020-0129159, filed on Oct. 7, 2020, in the Korean Intellectual Property Office and Korean Patent Application No. 10-2021-0056285, filed on Apr. 30, 2021, in the Korean Intellectual Property Office, the disclosures of which are incorporated by reference herein in their entireties.

BACKGROUND

Field

The disclosure relates to an electronic device, e.g., an antenna device and an electronic device including the antenna device.

Description of Related Art

Developing electronic information communication technology integrates various functionalities into a single electronic device. For example, smartphones pack the functionalities of a sound player, imaging device, and scheduler, as well as the communication functionality and, on top of that, may implement more various functions by having applications installed thereon. An electronic device may not only its equipped applications or stored files but also access, wiredly or wirelessly, a server or another electronic device to receive, in real-time, various pieces of information.

The user of an electronic device may search, screen, and obtain more information by accessing a network, but rather than simply using the own functionalities (e.g., applications) or information of the electronic device. Direct access to the network (e.g., wired communication) may enable quick and stable communication establishment but its usability may be limited to a fixed location or space. Wireless network access is less limited in location or space, delivers such a level of speed and stability as approaches those of direct network access, and is expected to be able to establish communication faster and more stable than direct network access.

In providing wireless access, an electronic device may include a plurality of antenna devices meeting various communication protocols, and a wireless communication relay device of a base station may also include an antenna capable of covering a sufficient area. After being commercially available, the 4G wireless communication system gradually goes over to the 5G wireless communication system to meet increasing demand for wireless data traffic. The 5G wireless communication system is implemented in a millimeter wave (mmWave) band, and the electronic device carried by the user or the base station may include an array antenna. Radio signals in an mmWave band may have high straightness and high directivity, and an array antenna may secure sufficient coverage by performing beam tilting using phase difference feeding.

An array antenna may include a plurality of radiation patches or radiation conductors. The plurality of radiation patches, each of which has a size of a few millimeters, may be arrayed at intervals less than a few millimeters. Interference between adjacent radiation patches may deteriorate antenna performance when the array antenna operates. Although remaining stable by forming an isolation structure between adjacent radiation patches, antenna performance may vary depending on the orientation during beam tilting.

SUMMARY

Embodiments of the disclosure provide an antenna device including an isolation structure forming a stable operational environment for adjacent radiation patches (or radiation conductors) and/or an electronic device including the antenna device.

Embodiments of the disclosure provide an array antenna device, in which distortion or antenna performance deviation depending on orientations during beam tilting may be reduced, and an electronic device including the antenna device.

According to various example embodiments of the disclosure, an antenna device comprises: a first antenna array including an array of a plurality of first radiation patches, a communication circuit configured to transmit and/or receive a radio signal using at least one of the first radiation patches, and at least one first isolator comprising a conductor disposed in an area between two adjacent first radiation patches among the first radiation patches. The first isolator may include a first portion, a second portion disposed in parallel with the first portion, and a third portion electrically connecting the first portion with the second portion. The first portion and the second portion may be configured to generate current flows having a phase difference of 180 degrees with respect to each other.

According to various example embodiments of the disclosure, an electronic device may comprise: a housing, and at least one antenna module disposed in the housing. The antenna module may include a first antenna array including an array of a plurality of first radiation patches, a communication circuit configured to transmit and/or receive a radio signal using at least one of the first radiation patches, and at least one first isolator comprising a conductor disposed in an area between two adjacent first radiation patches among the first radiation patches. The first isolator may include a first portion, a second portion disposed in parallel with the first portion, and a third portion electrically connecting the first portion with the second portion. The first portion and the second portion may be configured to generate current flows having a phase difference of 180 degrees with respect to each other.

According to various example embodiments of the disclosure, it is possible to block interference between two adjacent radiation patches or between two adjacent radiation conductors by placing an isolator(s) between the radiation patches or between the radiation conductors. In various example embodiments, the isolator may generate currents having a phase difference of 180 degrees at two different portions and may thus function as an absorber. For example, according to various example embodiments of the disclosure, the antenna device and/or the electronic device may have stable wireless communication performance. In various example embodiments, the isolator may suppress or prevent distortion or antenna performance deviation depending on orientations upon performing beam tilting at the array antenna. Other various effects may be provided directly or indirectly in the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
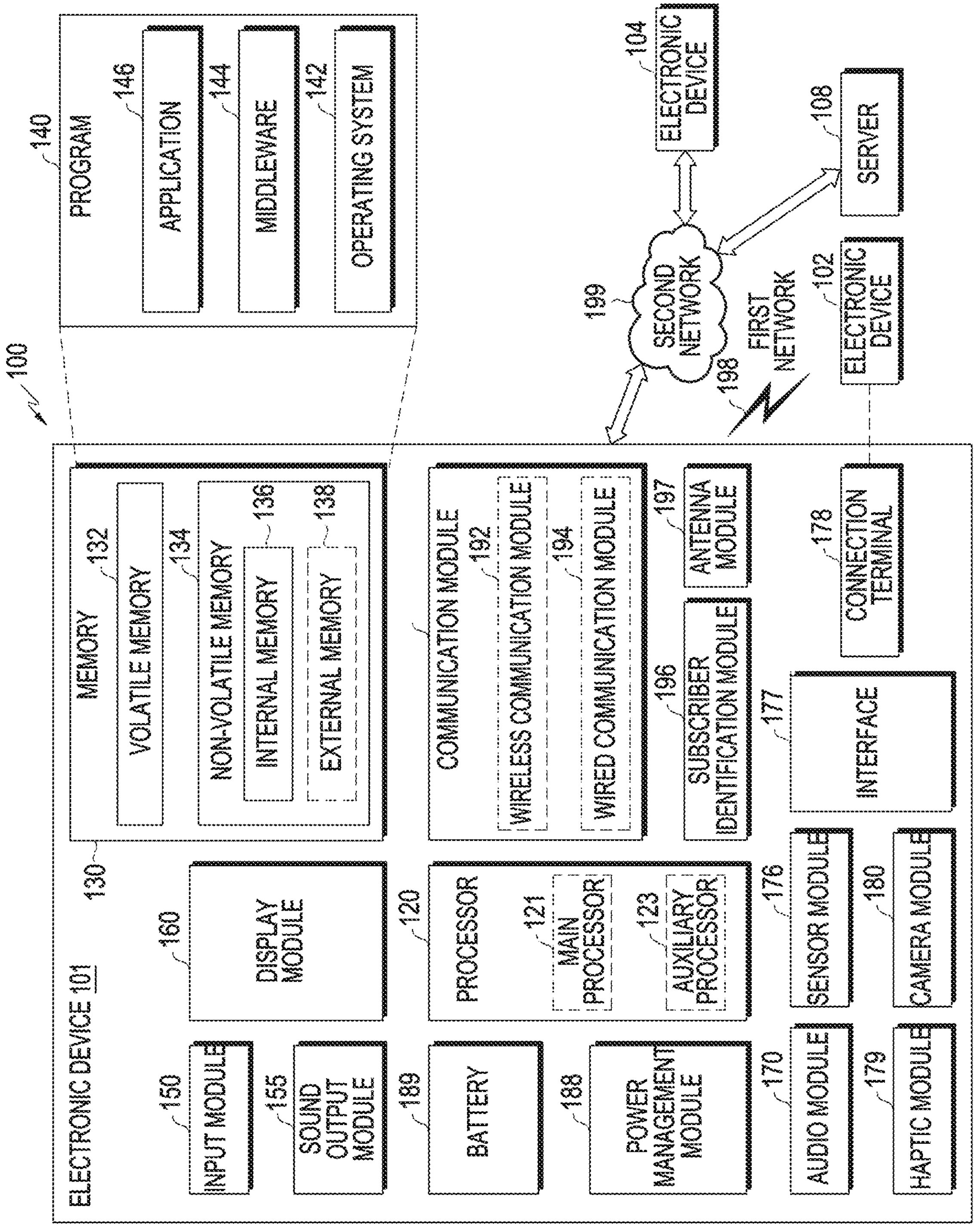
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen). The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
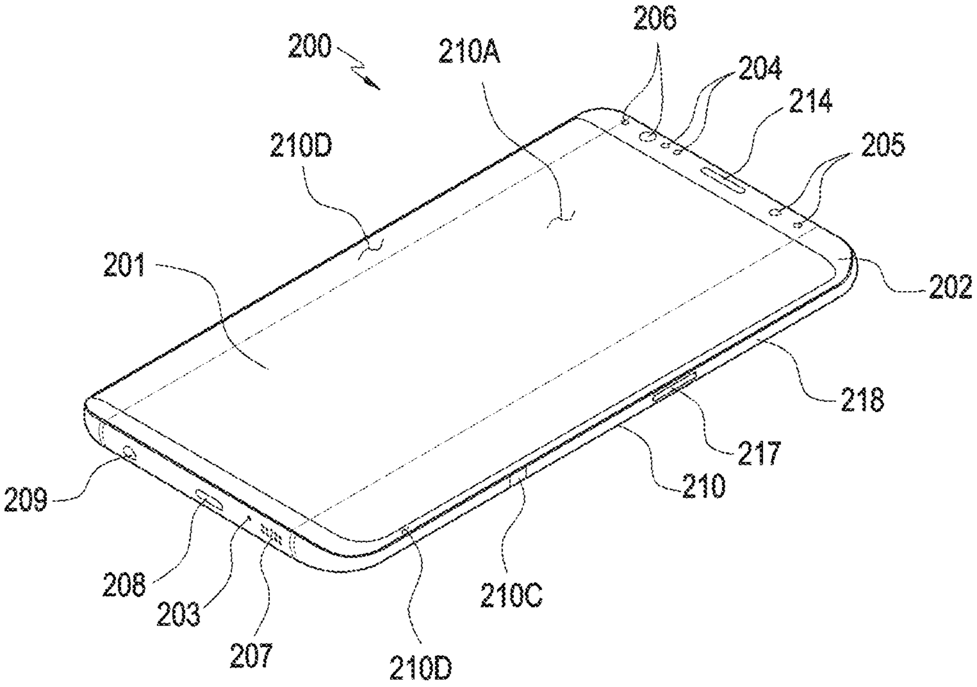
FIG. 2 is a front perspective view illustrating an electronic device according to various embodiments.
Figure 3:
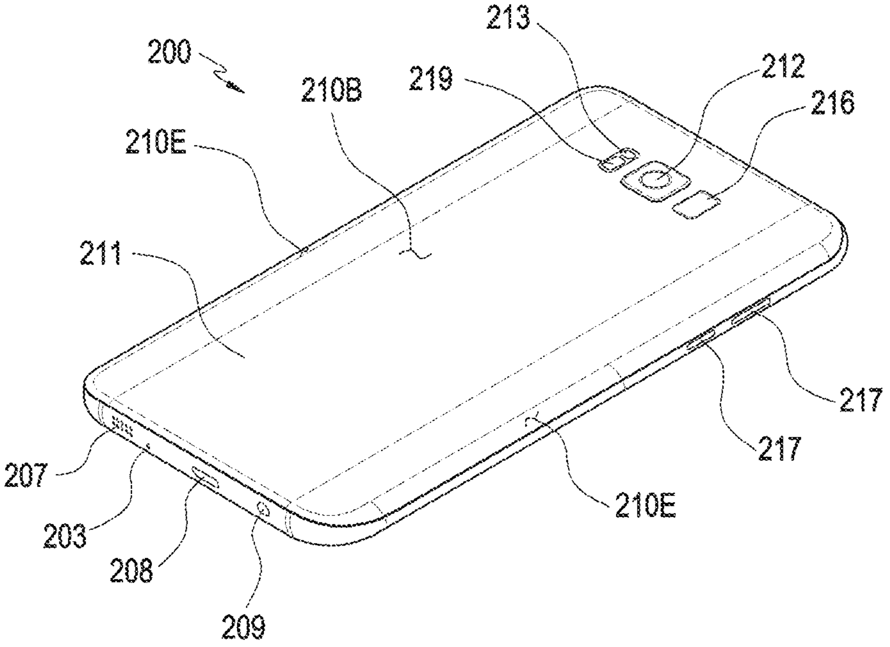
FIG. 3 is a rear perspective view illustrating the electronic device of FIG. 2 according to various embodiments.

FIG. 2 is a front perspective view illustrating an electronic device 200 according to various embodiments. FIG. 3 is a rear perspective view illustrating the electronic device 200 of FIG. 2 according to various embodiments.

Referring to FIGS. 2 and 3, according to an embodiment, an electronic device 200 may include a housing 210 including a first side (or front surface) 210A, a second side (or rear surface) 210B, and a side surface 210C surrounding the space between the first surface 210A and the second surfaces 210B. According to an embodiment (not shown), the housing may denote a structure forming part of the first surface 210A, the second surface 210B, and the side surface 210C of FIG. 2. According to an embodiment, at least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side structure 218 that couples to the front plate 202 and the rear plate 211 and includes a metal and/or polymer. According to an embodiment, the rear plate 211 and the side surface structure 218 may be integrally formed together and include the same material (e.g., a metal, such as aluminum).

In the embodiment illustrated, the front plate 202 may include two first regions 110D, which seamlessly and bendingly extend from the first surface 210A to the rear plate 211, on both the long edges of the front plate 202. In the embodiment (refer to FIG. 3) illustrated, the rear plate 211 may include second regions 210E, which seamlessly and bendingly extend from the second surface 210B to the front plate 202, on both the long edges. According to an embodiment, the front plate 202 (or the rear plate 211) may include only one of the first regions 210D (or the second regions 210E). Alternatively, the first regions 210D or the second regions 210E may partially be excluded. According to embodiments, at side view of the electronic device 200, the side structure 218 may have a first thickness (or width) for sides that do not have the first regions 210D or the second regions 210E and a second thickness, which is smaller than the first thickness, for sides that have the first regions 210D or the second regions 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be visible through a significant portion of the front plate 202. According to an embodiment, at least a portion of the display 201 may be visible through the front plate 202 forming the first surface 210A and the first regions 210D of the side surface 210C. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment (not shown), the screen display region of the display 201 may have a recess or opening in a portion thereof, and at least one or more of the audio module 214, sensor module 204, camera module 205, and light emitting device 206 may be aligned with the recess or opening. According to an embodiment (not shown), at least one or more of the audio module 214, sensor module 204, camera module 205, fingerprint sensor 216, and light emitting device 206 may be included on the rear surface of the screen display region of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first regions 210D and/or the second regions 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210A as well as on the first surface 210B (e.g., the display 201) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting device (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 4:
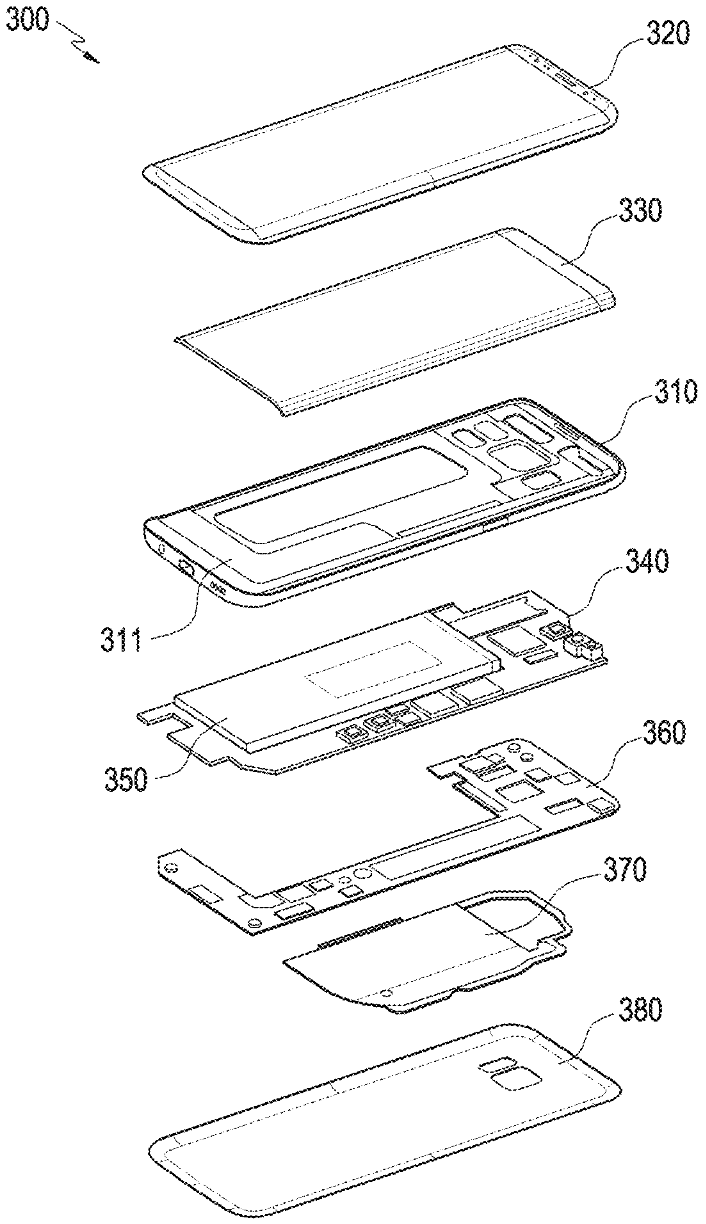
FIG. 4 is an exploded perspective view illustrating the electronic device of FIG. 2 according to various embodiments.

FIG. 4 is an exploded perspective view illustrating the electronic device 300 of FIG. 2 according to various embodiments.

Referring to FIG. 4, an electronic device 300 may include a side structure (e.g., a bezel) 310, a first supporting member 311 (e.g., a bracket), a front plate 320, a display 330, a printed circuit board 340, a battery 350, a second supporting member 360 (e.g., a rear case), an antenna 370, and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 200 of FIG. 2 or 3 and no duplicate description is made below.

The first supporting member 311 may be disposed inside the electronic device 300 to be connected with the side surface structure 310 or integrated with the side surface structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side structure 310 and/or the first supporting member 311.

Figure 5:
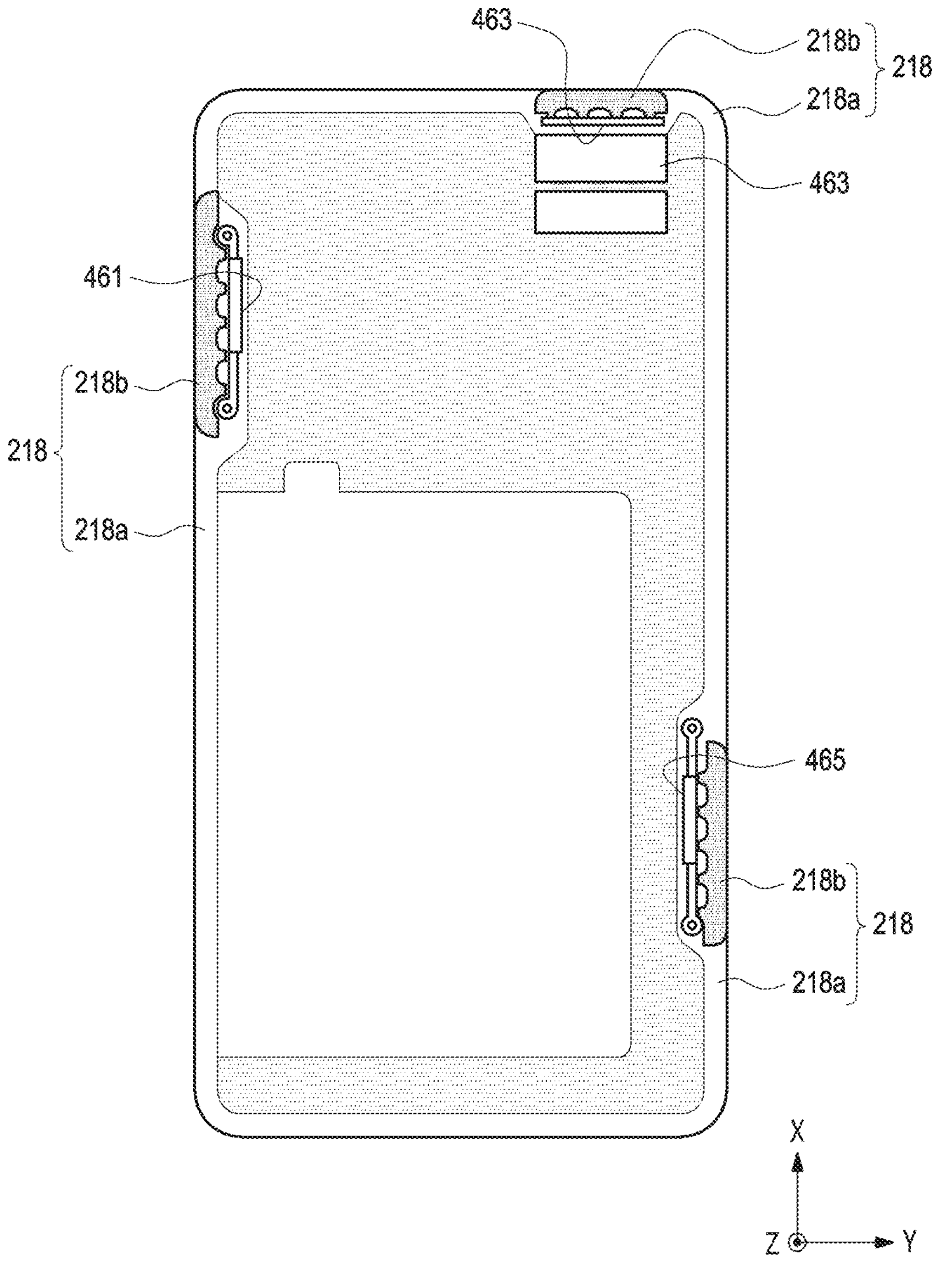
FIG. 5 is a diagram illustrating an example configuration of an electronic device according to various embodiments.

FIG. 5 is a diagram illustrating an example configuration of an electronic device 400 (e.g., the electronic device 200 or 300 of FIGS. 2, 3 and 4) according to various embodiments.

Referring to FIG. 5, in the illustrated embodiment, an electronic device 400 may include a housing (e.g., the housing 210 of FIG. 2) including a first plate or front plate (e.g., the front plate 202 of FIG. 2), a second plate or rear plate (e.g., the rear plate 211 of FIG. 3) spaced apart from and facing away from the first plate 202, and a side structure (e.g., the side structure 218 of FIG. 2) surrounding a space between the first plate 202 and the second plate 211. In the illustrated embodiment, the side structure 218 may include an electrically conductive portion 218*a* or a non-electrically conductive portion 218*b*.

According to various embodiments, the electronic device 400 may include a main printed circuit board (PCB) (e.g., the printed circuit board 340 of FIG. 4) received in a space between the first plate 202 and the second plate 211 and/or a mid-plate (e.g., the first or second supporting member 311 or 360 of FIG. 4) and, optionally, may further include other various components.

According to an embodiment, the electronic device 400 may include at least one legacy antenna (not shown) using at least a portion of the electrically conductive portion 218*a*, as a radiation conductor, and the legacy antenna(s) may be used in, e.g., cellular communication (e.g., second generation (2G), third generation (3G), fourth generation (4G), or long-term evolution (LTE)), short-range communication (e.g., wireless-fidelity (Wi-Fi), Bluetooth, or near-field communication (NFC)), and/or global navigation satellite system (GNSS). According to an embodiment, the electronic device 400 may include a first antenna module 461, a second antenna module 463, and/or a third antenna module 465 to form directional beams. The antenna modules 461, 463, and 465 may be used for 5G network communication, mmWave communication, 60 GHz communication, or WiGig communication. The antenna modules 461, 463, and 465 may be disposed in the housing 210 to be spaced apart by a predetermined interval or more from a metallic member (e.g., the electrically conductive portion 218*a* of the side member 218) and/or legacy antenna(s) of the electronic device 400.

According to various embodiments, on the housing 210, a first antenna module 461 may be positioned on an upper left side (e.g., an edge facing in the −Y direction), a second antenna module 463 may be positioned on an upper side (e.g., an edge facing in the +X direction), and a third antenna module 465 may be positioned on a middle or lower right side (e.g., an edge facing in the +Y direction). According to an embodiment, there may be provided a plurality of second antenna modules 463 to radiate radio signals in the +X direction or the −Z direction. In an embodiment, the electronic device 400 may include additional antenna modules in additional positions (e.g., a bottom middle side (an edge facing in the −X direction)) or may exclude some of the antenna modules 461, 463, and 465. According to an embodiment, the antenna modules 461, 463, and 465 may be electrically connected with at least one communication processor (e.g., the processor 120 or communication module 190 of FIG. 1) on a main PCB (e.g., the printed circuit board 340 of FIG. 4) using conductive lines (e.g., coaxial cables or conductive lines provided in a flexible printed circuit board (FPCB)).

According to various embodiments, the antenna modules 461, 463, and 465 (e.g., the antenna module or antenna device 500 of FIG. 6) may include an antenna array (e.g., a patch antenna array or a dipole antenna array) and transmit/receive radio signals through the non-electrically conductive portion 218*b*. The configuration of the antenna modules 461, 463, and 465 is described below in greater detail with reference to FIGS. 6 and 7.

Figure 6:
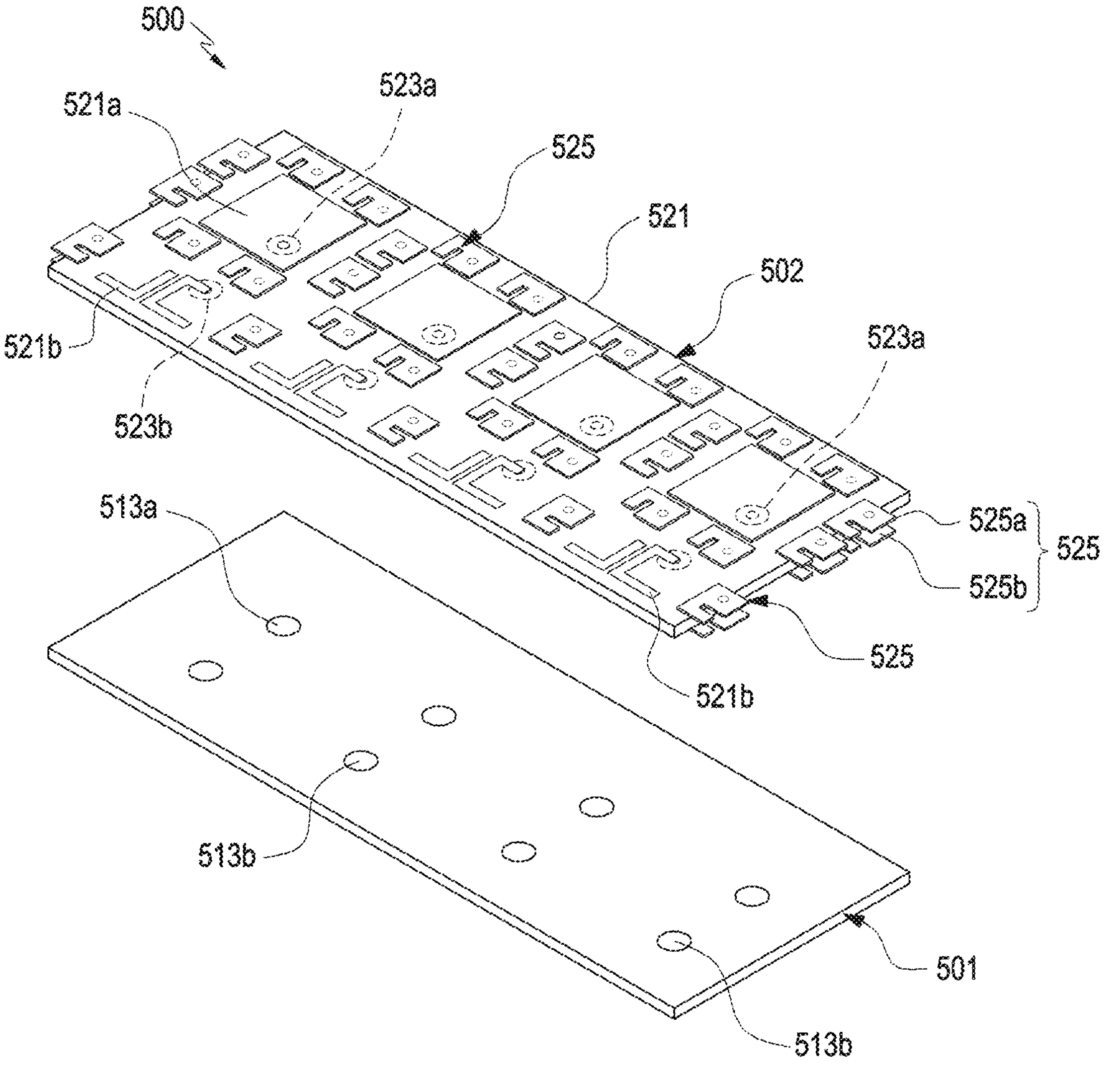
FIG. 6 is an exploded perspective view illustrating an antenna device according to various embodiments.
Figure 7:
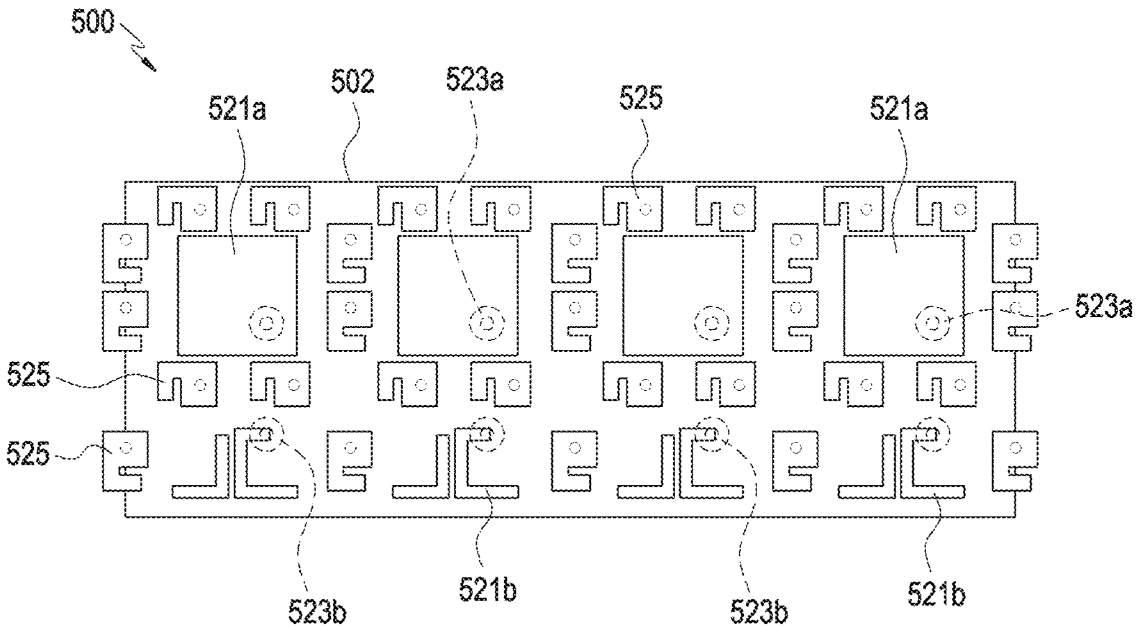
FIG. 7 is a diagram illustrating an example antenna device according to various embodiments.

FIG. 6 is an exploded perspective view illustrating an antenna device 500 (e.g., at least one of the antenna module 197 of FIG. 1 or the antenna modules 461, 463, and 465 of FIG. 5) according to various embodiments. FIG. 7 is a diagram illustrating an antenna device 500 according to various embodiments.

Referring to FIGS. 6 and 7, an antenna device 500 may include an antenna array 502 including an array of a plurality of radiation patches 521*a* (or radiation conductors 521*b*) and a communication circuit unit (e.g., the processor 120 or the communication module 190 of FIG. 1) configured to transmit/receive radio signals using at least one of the radiation patches 521*a* (or radiation conductors 521*b*) of the antenna array 502, and may include an isolator 525 disposed in an area between two adjacent radiation patches 521*a* (or radiation conductors 521*b*). The isolator 525 may provide an isolation structure between, e.g., two adjacent radiation patches 521*a*, thereby blocking electromagnetic interference (EMI) between the two radiation patches 521*a*.

According to various embodiments, the communication circuit unit may be disposed, in the form of an electronic component, e.g., an integrated circuit (IC) chip, on a main circuit board (e.g., the printed circuit board 340 of FIG. 4) and/or a first base substrate 501, and the antenna array 502 may include a second base substrate 521 on which radiation patches 521*a* (or radiation conductors 521*b*) are arranged. It should be noted that according to an embodiment, the second base substrate 521 is substantially integrated with the first base substrate 501. According to an embodiment, a plurality of feeding pads 513*a* and 513*b* may be disposed on one surface of the first base substrate 501 and, although not shown, the first base substrate 501 may include a connector for connection with the main circuit board (e.g., the printed circuit board 340 of FIG. 4). In an embodiment, an integrated circuit chip (e.g., a communication circuit unit) may be provided on the opposite surface of the first base substrate 501 and may be molded with an insulative resin. In various embodiments, the feeding pads 513*a* and 513*b* may be electrically connected to the connector or the integrated circuit chip through lines (e.g., microstrip lines) or vias provided on the first base substrate 501 and may provide feeding signals to the second base substrate 521 or the antenna array 502.

According to various embodiments, the radiation patches 521*a* or the radiation conductors 521*b* may be arranged on the second base substrate 521. In an embodiment, the radiation patches 521*a* may perform broadside radiation on the second base substrate 521, and the radiation conductors 521*b* may perform end fire radiation on the second base substrate 521. In an embodiment, the second base substrate 521 may include feeding ports 523*a* and 523*b* corresponding to the feeding pads 513*a* and 513*b*. The feeding ports 523*a* and 523*b* may be electrically connected with any one of the radiation patches 521*a* (or radiation conductors 521*b*) through traces (e.g., microstrip lines or such transmission lines) and/or vias provided on the second base substrate 521. For example, as the second base substrate 521 is coupled with the first base substrate 501 to face the first base substrate 501, the feeding pads 513*a* and 513*b* and the feeding ports 523*a* and 523*b* may form electrical connections to provide feeding signals to the radiation patches 521 or the radiation conductors 521*b*.

According to various embodiments, the radiation patches 521*a* may perform broadside radiation, e.g., transmit/receive radio signals in the direction in which one surface of the second base substrate 521 faces, and the radiation conductors 521*b* may transmit/receive radio signals in a direction crossing the direction in which the radiation patches 521*a* transmit/receive radio signals. In various embodiments, the direction in which the radiation conductors 521*b* transmit/receive radio signals may be substantially parallel to one surface of the second base substrate 521. In an embodiment, as phase difference feeding is provided to the radiation patches 521*a*, the radiation patches 521*a* may transmit/receive radio signals in various directions within a designated angular range. According to an embodiment, in the first antenna module 461 of FIG. 5, the radiation patches 521*a* may transmit/receive radio signals in the −Y direction, and the radiation conductors 521*b* may transmit/receive radio signals in the −Z direction or the +Z direction. According to an embodiment, the radiation patches 521*a* may be formed of a polygonal flat plate, and the radiation conductors 521*b* may be formed in a monopole structure or a dipole structure. In the illustrated embodiment, the radiation patches 521*a* may form a 1*4 array on the second base substrate 521, and the radiation conductors 521*b* may form a 1*4 array around the area where the radiation patches 521*a* are arranged (e.g., the edge of the second base substrate 521). However, various embodiments of the disclosure are not limited thereto, and the number and array of the radiation patches 521*a* or radiation conductors 521*b* may be appropriately changed depending on the space where the antenna device 500 is to be disposed.

According to various embodiments, on the second base substrate 521, the feeding ports 523*a* and 523*b* may be disposed on the same layer as, or a different layer from, the radiation patches 521*a* or the radiation conductors 521*b* and may be electrically connected with the radiation patches 521*a* or radiation conductors 521*b* through traces or vias provided on the second base substrate 521. For example, the radiation patches 521*a* may receive feeding signals from a first feeding pad 513*a* or first base substrate 501 through first feeding ports 523*a* among the feeding ports 523*a* and 523*b*, and the radiation conductors 521*b* may receive feeding signals from a second feeding pad 513*b* or first base substrate 501 through second feeding ports 523*b* among the feeding ports 523*a* and 523*b*.

According to various embodiments, the isolator 525 may be disposed in an area between two adjacent radiation patches 521*a*, an area between two adjacent radiation conductors 521*b*, and/or an area between one radiation patch 521*a* and one radiation conductor 521*b* adjacent thereto. In various embodiments, a plurality of isolators 525 may be arranged to surround one radiation patch 521*a* or radiation conductor 521*b*. In an embodiment, a plurality of isolators 525 may be disposed in an area between two adjacent radiation patches 521*a*, an area between two adjacent radiation conductors 521*b*, and/or an area between one radiation patch 521*a* and one radiation conductor 521*b* adjacent thereto. In an embodiment, the isolator 525 may block or suppress electromagnetic interference between two adjacent radiation patches 521*a* (or radiation conductors 521*b*). For example, when any one radiation patch 521*a* or radiation conductor 521*b* transmits/receives radio signals, the isolator 525 may block interference or induction of signal power in other radiation patches 521*a* or radiation conductors 521*b* therearound.

Figure 8:
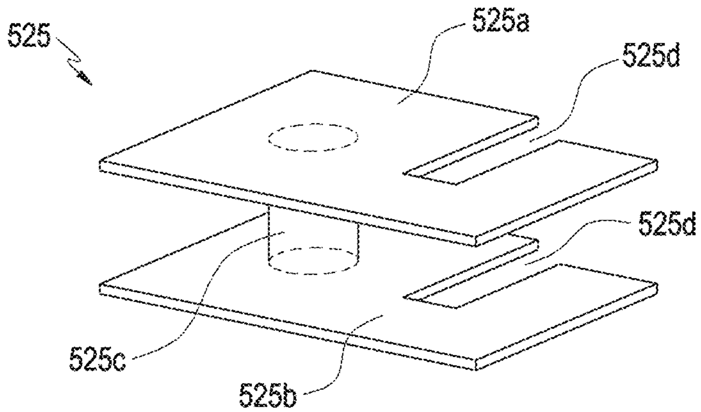
FIG. 8 is a perspective view illustrating an isolator of an antenna device according to various embodiments.

FIG. 8 is a perspective view illustrating an isolator 525 (e.g., the isolator 525 of FIG. 6 or 7) of an antenna device (e.g., the antenna module 461, 463, or 465 of FIGS. 5 to 8 or the antenna device 500) according to an embodiment of the disclosure.

Referring to FIG. 8, the isolator 525 may include a first portion, a second portion, and/or a third portion. For example, a first conductive pad 525*a* and a second conductive pad 525*b* which are shaped as flat plates forming the first portion and the second portion may be disposed to face each other or in parallel with each other, and a connecting conductor 525*c* disposed between the first conductive pad 525*a* and the second conductive pad 525*b* may form the third portion of the isolator 525. The connecting conductor 525*c* may have an end electrically connected with the first conductive pad 525*a* and another end electrically connected with the second conductive pad 525*b*. For example, the first conductive pad 525*a* and the second conductive pad 525*b* may be electrically connected with each other through the connecting conductor 525*c*. According to an embodiment, when a current flow is generated in the isolator 525, the current flow may pass through the third portion (e.g., the connecting conductor 525*c*), and the first conductive pad 525*a* and the second conductive pad 525*b* may generate current flows in opposite directions.

According to various embodiments, the first conductive pad 525*a* and the second conductive pad 525*b* may have substantially the same shape and, at plan view, may be disposed to overlap each other. In various embodiments, the first conductive pad 525*a* and the second conductive pad 525*b* may include slots 525*d* extending inward from the edges. Depending on the slots 525*d*, the first conductive pad 525*a* and the second conductive pad 525*b* may have a meander line shape, and their electrical length may be adjusted relative to their external size. The shape and external size of the conductive pads 525*a* and 525*b* are described in greater detail below with reference to FIGS. 9, 10, 11 and 12.

Figure 9:
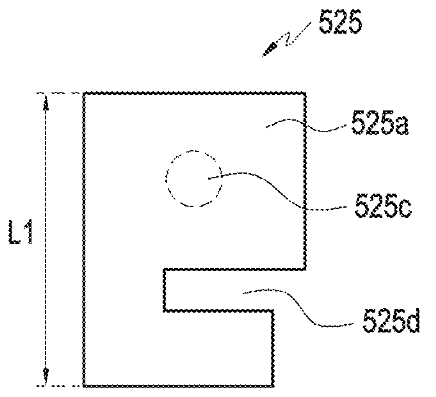
FIG. 9 is a diagram illustrating an example isolator of an antenna device according to various embodiments.
Figure 10:
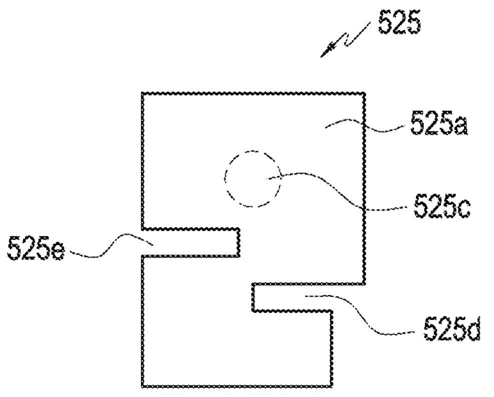
FIG. 10 is a diagram illustrating an example isolator in an antenna device according to various embodiments.
Figure 11:
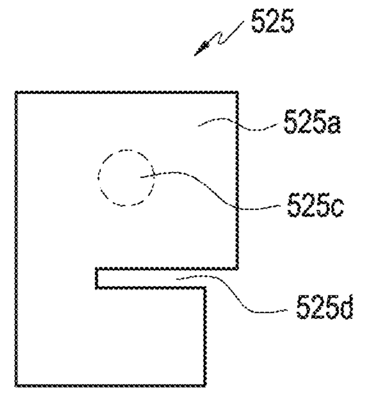
FIG. 11 is a diagram illustrating an example isolator in an antenna device according to various embodiments.

FIG. 9 is a diagram illustrating an isolator (e.g., the isolator 525 or first conductive pad 525*a* of FIG. 8) of an antenna device (e.g., the antenna module 461, 463, or 465 of FIGS. 5 to 7 or the antenna device 500) according to various embodiments. FIG. 10 is a diagram illustrating an isolator 525 in an antenna device 500 according to various embodiments. FIG. 11 is a diagram illustrating an isolator 525 in an antenna device 500 according to various embodiments. FIG.

12 is a diagram illustrating an isolator 525 in an antenna device 500 according to various embodiments.

FIGS. 9, 10, 11 and 12 illustrate various shapes of the first conductive pad 525*a* or the second conductive pad 525*b* depending on, e.g., the arrangement of the slots 525*d* and 525*e*. Referring to FIGS. 9, 10, 11 and 12, the first conductive pad 525*a* and the second conductive pad 525*b* may include at least one slot 525*d* and 525*e* internally extending from a portion of the edge. In various embodiments, the first conductive pad 525*a* and the second conductive pad 525*b* formed on the second base substrate 521 may slightly differ in shape or size within an allowable manufacturing tolerance range. For example, in one second base substrate 521, there may be a slight difference in the length or width of the slots 525*d* and 525*e* between the first conductive pads 525*a*, between the second conductive pads 525*b*, and/or between the first conductive pad 525*a* and second conductive pad 525*b* facing each other. According to an embodiment, the shape or size of the slots 525*d* and 525*e* according to the manufacturing tolerance may not have a substantial influence on the isolation structure using the isolator 525 or the characteristics of the cutoff frequency. For example, the isolation structure using the isolator 525 or the characteristics of the cutoff frequency may be determined by the electrical length of the first conductive pad 525*a* and/or the second conductive pad 525*b*.

Figure 12:
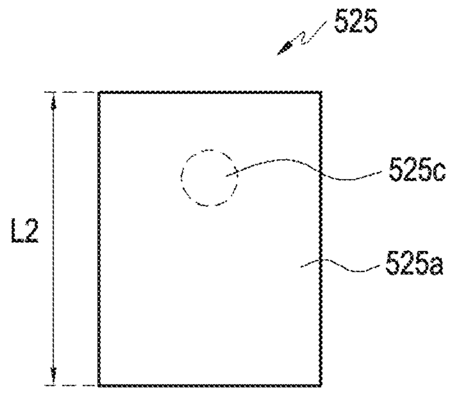
FIG. 12 is a diagram illustrating an example isolator in an antenna device according to various embodiments.

According to various embodiments, as illustrated in FIG. 12, the first conductive pad 525*a* and the second conductive pad 525*b* may have a polygonal shape that does not include the slots 525*d* and 525*e*. According to an embodiment, when a first length L1 as illustrated by way of example in FIG. 9 is the same as a second length L2 as illustrated by way of example in FIG. 12, the conductive pad (e.g., the first conductive pad 525*a*) of FIG. 9, which includes the slots 525*d* and 525*e*, may have a longer electrical length than the conductive pad of FIG. 12. For example, the electrical length of the conductive pad 525*a* of FIG. 9 may be greater than the first length L1, and the conductive pad of FIG. 12 may have an electrical length substantially corresponding to the second length L2. In various embodiments, when conductive pads having the same electrical length are manufactured, the external size (e.g., the first length L1 or the second length L2) of the first conductive pad 525*a* may be reduced due to the slots 525*d* and 525*e*. For example, if the conductive pads of FIGS. 9 and 12 (e.g., the first conductive pad 525*a*) have the same electrical length, the first length L1 may be smaller than the second length L2.

According to various embodiments, as the conductive pad includes the slots 525*d* and 525*e* while remaining the same in length, the external size (e.g., the first length L1 or second length L2 of FIG. 9 or 12) of the conductive pad may reduce, so that the isolator 525 may be made in smaller size. In an embodiment, as the isolator 525 reduces in size, it is possible to easily implement an antenna (e.g., the antenna device 500 of FIG. 6) for transmitting/receiving radio signals in a mmWave band. For example, in implementing an antenna array in which radiation patches are arranged at intervals smaller than the size of each radiation patch (e.g., the radiation patch 521*a* or radiation conductor 521*b* of FIG. 6) which is merely a few millimeters long, it is possible to easily dispose the downsized isolator 525 between radiation patches 521*a*. In an embodiment, the isolator 525 may block electromagnetic interference between radiation patches (e.g., the radiation patches 521*a* or radiation conductors 521*b* of FIG. 6), enhancing antenna performance and suppressing antenna performance deviations depending on orientations during beam tilting.

As mentioned above, the first conductive pad 525*a* and the second conductive pad 525*b* may be disposed to substantially overlap each other in a plan view, and may be electrically connected to each other through the connecting conductor 525*c*. For example, when a current flow is generated on the isolator 525, the first conductive pad 525*a* and the second conductive pad 525*b* may generate current flows having a phase difference of 180 degrees with respect to each other.

Figure 13:
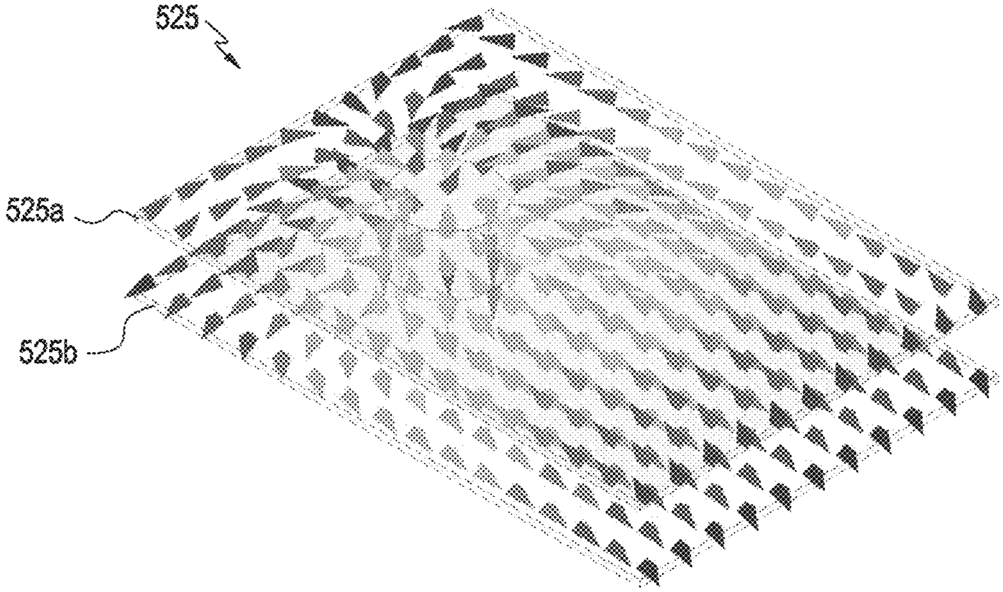
FIG. 13 is a diagram illustrating a current flow in an isolator when an antenna device operates according to various embodiments.

FIG. 13 is a diagram illustrating a current flow in an isolator 525 when an antenna device (e.g., the antenna module 461, 463, or 465 of FIGS. 5 to 7 or the antenna device 500) operates according to various embodiments.

Referring to FIG. 13, when a current flow in a first direction is generated in the isolator 525, e.g., either the first conductive pad 525*a* or the second conductive pad 525*b*, a current flow in a direction opposite to the first direction may be generated in the other conductive pad. For example, if a current flow towards the connecting conductor 525*c* is generated in the first conductive pad 525*a*, a current flow away from the connecting conductor 525*c* may be generated in the second conductive pad 525*b*. In this case, the current flow in the first conductive pad 525*a* may have a phase difference of 180 degrees from the current flow in the second conductive pad 525*b*. In various embodiments, depending on where the connecting conductor 525*c* is connected, the isolator 525 may be shaped substantially as the letter 'H' or the letter 'U' in side view.

According to various embodiments, the isolator 525 between two adjacent radiation conductors (e.g., the first radiation patch 521*a* or radiation conductor 521*b* of FIG. 6 or 7) may serve as an electromagnetic shielding structure or isolation structure. For example, when electromagnetic energy generated from one of two radiation conductors (e.g., the first radiation patch 521*a* or radiation conductor 521*b* of FIG. 6 or 7) interferes with or is induced in the other radiation conductor, the first conductive pad 525*a* and the second conductive pad 525*b* may generate currents in opposite directions from each other by the generated electromagnetic energy, and the isolator 525 may substantially absorb or block the interfering or induced electromagnetic energy in the other radiation conductor. Thus, the radiation conductors (e.g., the first radiation patch 521*a* or radiation conductor 521*b* of FIG. 6 or 7) may perform designed radiation performance or beam tilting without interfering with each other.

According to various embodiments of the disclosure, the above-described isolator 525 may be disposed in a wireless communication relay device of a base station, e.g., an antenna device for transmitting/receiving radio signals in an mmWave band. Antenna devices of wireless communication relay devices may have a larger degree of freedom in design than personal electronic devices (e.g., the electronic devices 101, 102, 104, 200, 300, and 400 of FIGS. 1 to 5). For example, the antenna device includes an antenna array include more radiation patches and may thus have a higher performance in radiation power or coverage than the antennas (e.g., the antenna modules 461, 463, and 465 of FIG. 5) of the personal electronic device. Such an antenna device is described in greater detail below with reference to FIGS. 14, 15 and 16. In the following description, the components easy to understand from the description of the above embodiments are denoted with or without the same reference numerals and their detailed description may be skipped.

Figure 14:
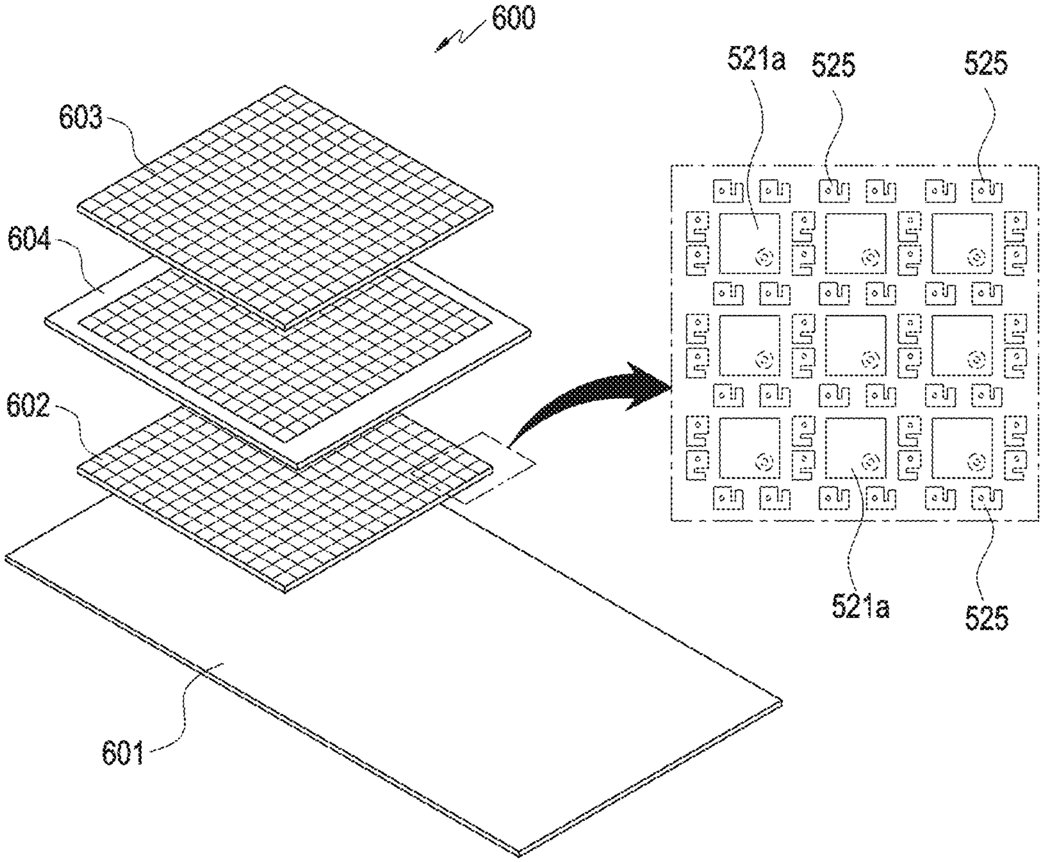
FIG. 14 is an exploded perspective view illustrating an antenna device according to various embodiments.
Figure 15:
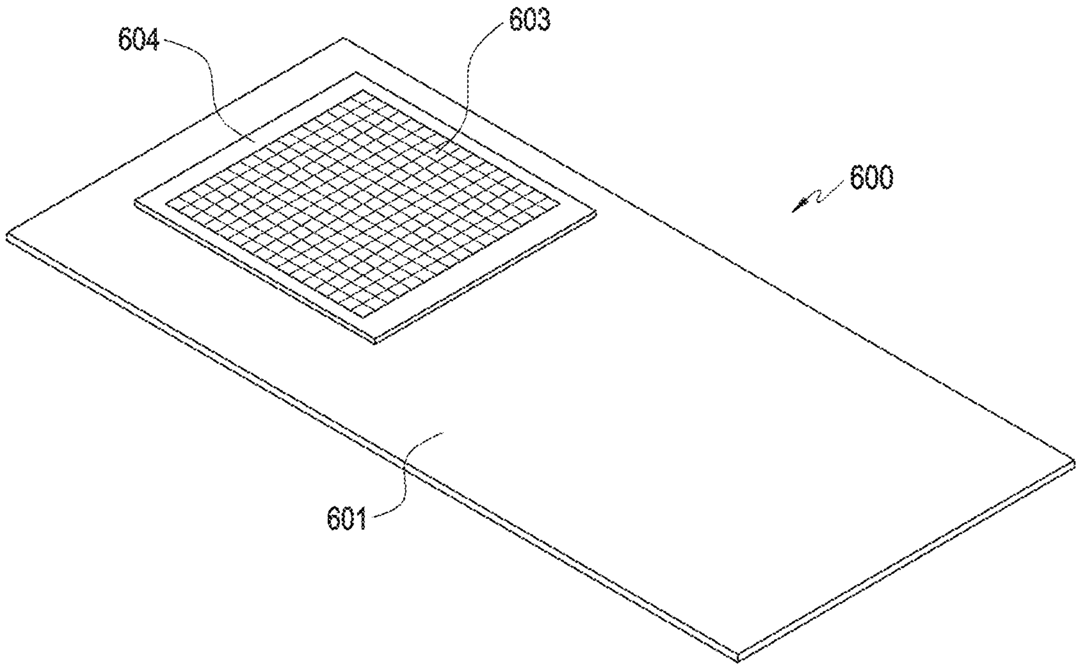
FIG. 15 is a perspective view illustrating an antenna device according to various embodiments.
Figure 16:
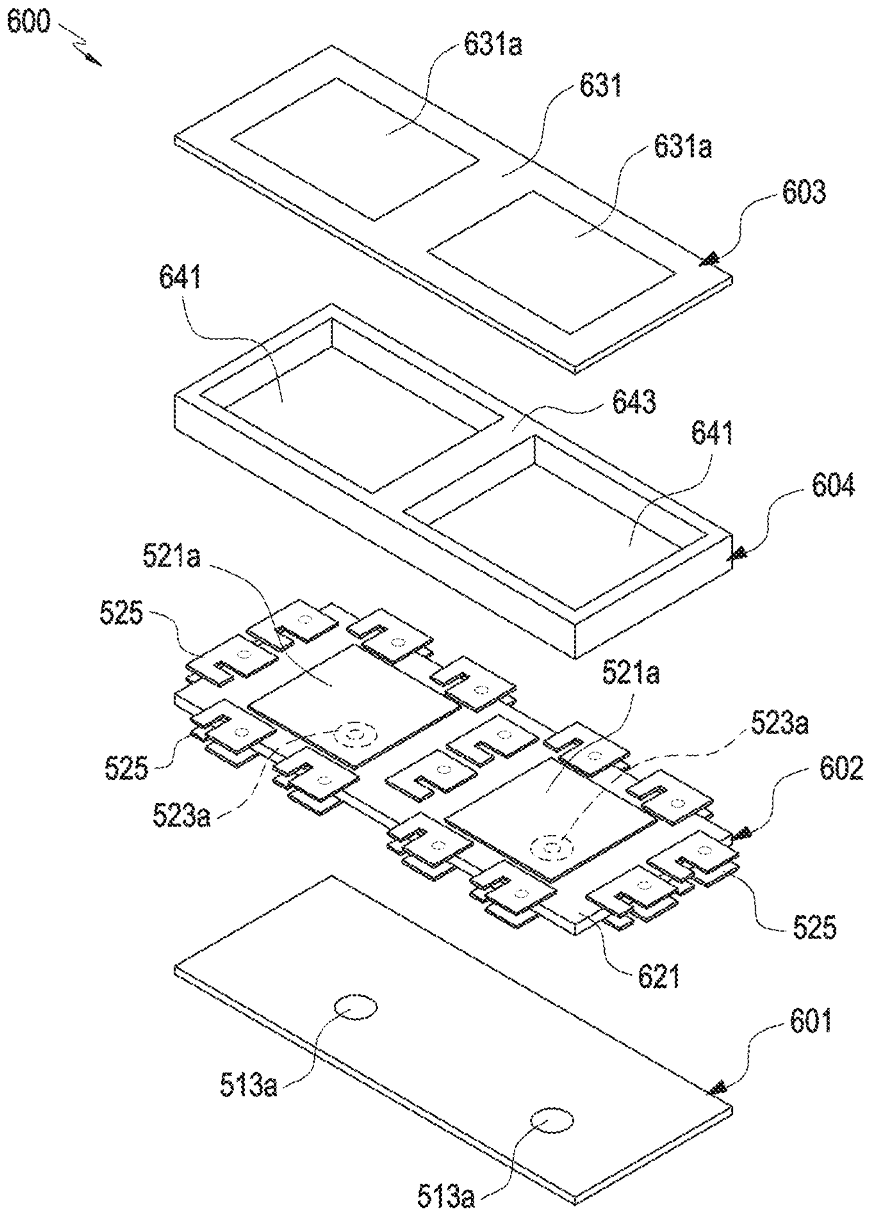
FIG. 16 is an enlarged exploded perspective view illustrating a portion of an antenna device according to various embodiments.

FIG. 14 is an exploded perspective view illustrating an antenna device 600 (e.g., the antenna module 197 of FIG. 1, the antenna module 461, 463, or 465 of FIG. 5, or the antenna device 500 of FIGS. 6 and 7) according to various embodiments. FIG. 15 is a perspective view illustrating an antenna device 600 according to various embodiments. FIG. 16 is an enlarged exploded perspective view illustrating a portion of an antenna device 600 according to various embodiments.

Referring to FIGS. 14, 15 and 16, an antenna device 600 may include a first antenna array 602 (e.g., the antenna array 502 of FIG. 6), a second antenna array 603, a mesh plate 604, and a communication circuit unit (e.g., the processor 120 or communication module 190 of FIG. 1). The communication circuit unit may be provided in the form of an integrated circuit chip disposed on a first base substrate 601. In various embodiments, the whole or at least a portion of the communication circuit unit may be disposed on the printed circuit board 340 of FIG. 4. If a portion of the communication circuit unit is disposed on the printed circuit board 340 of FIG. 4, another portion of the communication circuit unit may be disposed on the first base substrate 601. The first base substrate 601 may include traces (e.g., transmission lines such as microstrip lines) and/or vias for electrically connecting the feeding pads 513*a* with the communication circuit unit. The first antenna array 602 may include first radiation patches 521*a* (e.g., the radiation patches 521*a* of FIG. 6 or 7) forming a 16×16 array on a second base substrate 621, for example. According to an embodiment, at least one isolator 525 (e.g., the isolator 525 of FIG. 8) may be disposed between two adjacent first radiation patches 521*a*, blocking electromagnetic interference between the two first radiation patches 521*a*. The configuration of the first antenna array 602, the communication unit, and/or the isolator 525 may be similar to that of the antenna device 500 of FIG. 6, and a detailed description thereof may not be repeated. Although according to an embodiment, the first radiation patches 521*a* form a 16*16 array, various embodiments of the disclosure are not limited thereto, and the number or array of the first radiation patches 521*a* may be varied depending on the specifications (e.g., radiation power or coverage) required for the antenna device 600.

According to various embodiments, the second antenna array 603 is disposed to face the first antenna array 602 and may include a plurality of second radiation conductors 631*a* provided on a third base substrate 631. For example, the second radiation conductors 631*a* may form a 16×16 array and may be disposed to face any one of the first radiation patches 521*a*. In an embodiment, the second radiation conductors 631*a* and/or the second antenna array 603 may convert electromagnetic waves or suppress side lobes when the first radiation patches 521*a* and/or the first antenna array 602 transmits/receives radio signals. For example, the second radiation conductors 631*a* and/or the second antenna array 603 may convert electromagnetic waves radiated from the first radiation patches 521*a* and/or the first antenna array 602 into plane waves or concentrate or align the radiation power in the oriented direction, thereby enhancing the power efficiency of the antenna device 600.

According to various embodiments, the mesh plate 604 may be disposed between the first antenna array 602 and the second antenna array 603 to function as a spacer. According to an embodiment, the mesh plate 604 may include a plurality of cavities 641 and a barrier 643 formed between two adjacent cavities 641. For example, the barrier 643 may be a wall structure substantially defining the cavity 641. The cavities 641 may be arranged corresponding to the array of the first radiation patches 521*a* or second radiation conductors 631*a*. For example, the cavity 641 may form a 16*16 array, and the second radiation patches 631*a* may be disposed to face any one of the first radiation patches 521*a* through any one of the cavities 641. The barrier 643 may be disposed in a position corresponding to the isolator 525, e.g., in an area between two adjacent first radiation patches 521*a*. In various embodiments, the mesh plate 604 may at least partially include an electromagnetic shielding material and, together with the isolator 525, may block electromagnetic interference between two adjacent first radiation patches 521*a*. In an embodiment, by including an electromagnetic shielding material, the mesh plate 604, together with the isolator 525, may block electromagnetic interference between two adjacent second radiation patches 631*a*.

Figure 17:
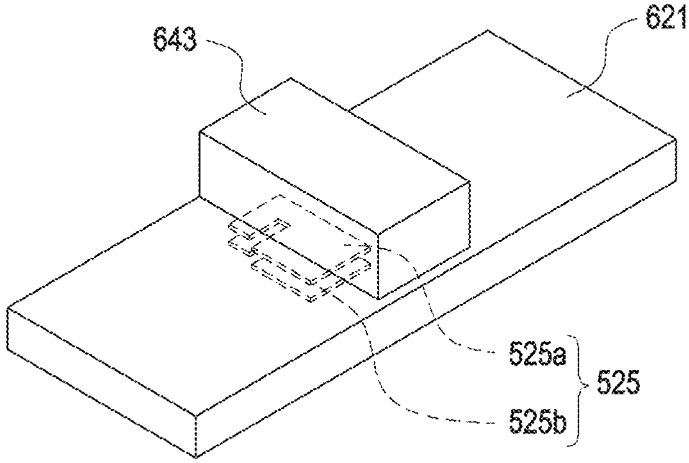
FIG. 17 is a perspective view illustrating an example in which an isolator is disposed in an antenna device according to various embodiments.
Figure 18:
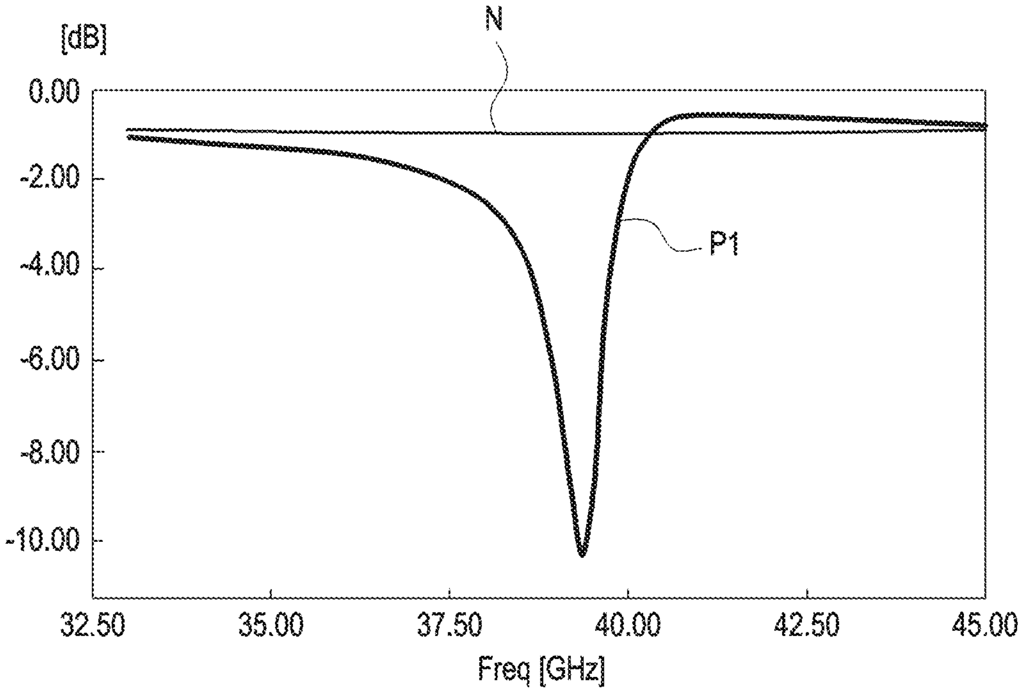
FIG. 18 is a graph illustrating isolation characteristics measured between radiation patches in the antenna device of FIG. 17 according to various embodiments.

FIG. 17 is a perspective view illustrating an example in which an isolator 525 is disposed in an antenna device (e.g., the antenna device 600 of FIGS. 14 to 16) according to various embodiments. FIG. 18 is a graph illustrating isolation characteristics measured between radiation patches (e.g., the first radiation patches 521*a* of FIG. 16) in the antenna device 600 of FIG. 17 according to various embodiments.

FIG. 17 illustrates a configuration in which the barrier 643 of the mesh plate 604 and one isolator 525 form an isolation structure in an area between two adjacent first radiation patches 521*a* in the antenna device 600. FIG. 18 illustrates graphs for the results of measurement of transmission coefficient S21 before and after one isolator 525 is disposed, where the graph indicated with 'N' is the transmission coefficient before the isolator 525 is disposed, and the graph indicated with 'P1' is the transmission coefficient S21 measured, with one isolator 525 disposed.

In various embodiments, when performing wireless communication in the antenna device 600 having a phased array structure, a surface wave having a vertically polarized component of the substrate may be generated, causing poor isolation between adjacent radiation patches (e.g., the first radiation patches 521*a* of FIG. 16). According to various embodiments of the disclosure, the antenna device 600 includes the isolator 525, thereby suppressing surface waves and securing a sufficient degree of isolation between two adjacent first radiation patches 521*a*, which may be identified from the results of measurement of transmission coefficient S21 as shown in FIG. 18. For example, as compared with the structure devoid of the isolator 525, the antenna device 600 may improve the transmission coefficient S21 in frequency bands below about 40 GHz.

Figure 19:
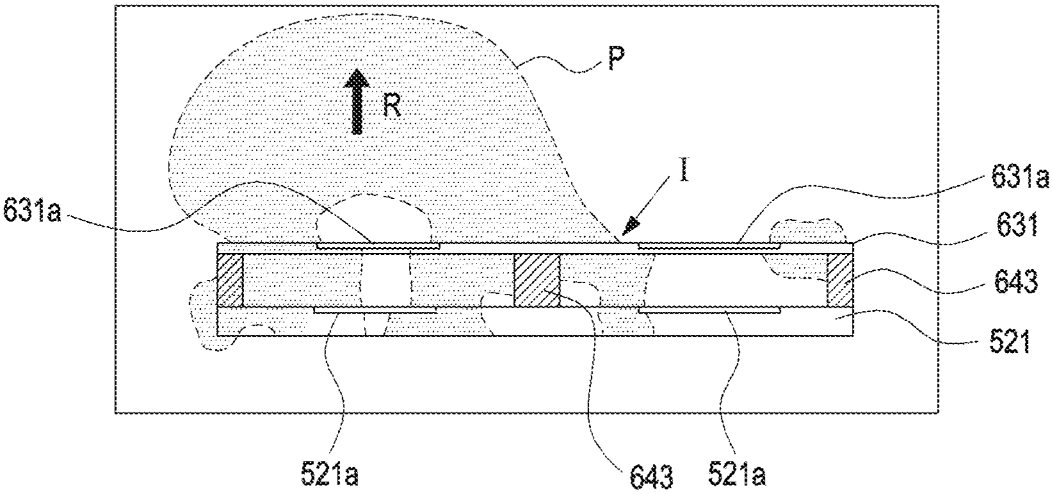
FIG. 19 is a diagram illustrating a radiation power distribution before an isolator is disposed in an antenna device according to various embodiments.
Figure 20:
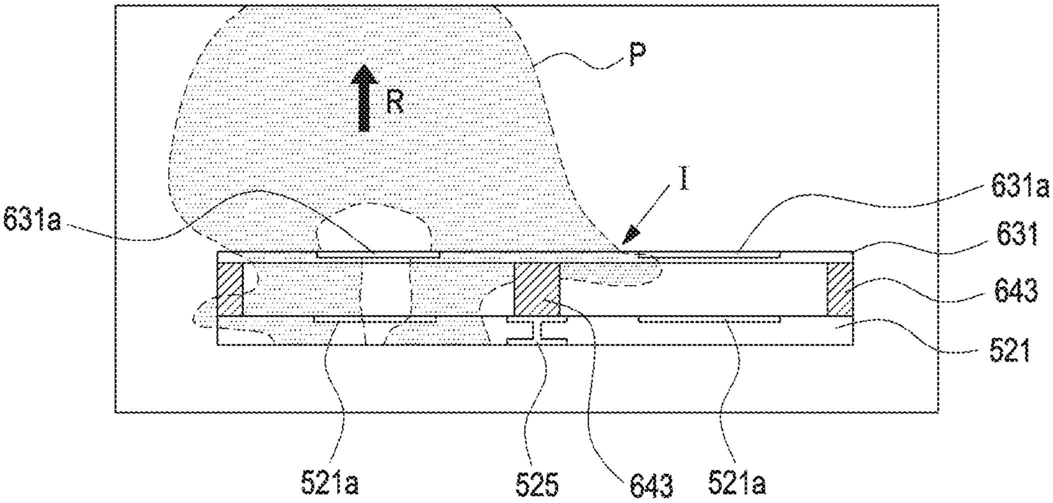
FIG. 20 is a diagram illustrating a radiation power distribution of an antenna device according to various embodiments.

FIG. 19 is a diagram illustrating radiation power distribution before an isolator 525 is disposed in an antenna device (e.g., the antenna device 600 of FIGS. 14, 15 and 16) according to various embodiments. FIG. 20 is a diagram illustrating radiation power distribution of an antenna device (e.g., the antenna device 600 of FIGS. 14, 15 and 16) according to various embodiments.

Referring to FIGS. 19 and 20, when a second base substrate 621 has a multi-layer circuit substrate, the first radiation patches 521*a* may be disposed on a layer forming a surface of the second base substrate 621 or on a layer adjacent to the surface. According to an embodiment, at least one (e.g., the first conductive pad 525*a*) of the conductive pads (e.g., the first conductive pad 525*a* and the second conductive pad 525*b* of FIG. 8) may be disposed on substantially the same layer as the first radiation patch 521*a*, and the other conductive pad (e.g., the second conductive pad 525*b*) may be disposed on a layer different from the first radiation patch 521*a* and connected with the first conductive pad 525*a* through a connecting conductor (e.g., the connecting conductor 525*c* of FIG. 8). In various embodiments, the first antenna array 602, the second antenna array 603, and/or the mesh plate 604 may be arranged to form substantially a single substrate. For example, the second radiation patch 631*a* may be formed on a layer different from the first radiation patch 521*a*, first conductive pad 525*a*, and/or second radiation patch 525*b* in substantially one substrate and may thus be disposed to face the first radiation patch 521*a*, with the interval or cavity (e.g., the cavity 641 of FIG. 16) of the mesh plate 604 disposed therebetween.

FIG. 19 illustrates an example distribution of radiation power formed around one of two adjacent radiation conductors (e.g., the first radiation patches 521*a* of FIG. 16) in an antenna device devoid of an isolator. FIG. 20 illustrates an example distribution of radiation power formed around one of two adjacent radiation conductors (e.g., the first radiation patches 521*a* of FIG. 16) in an antenna device (e.g., the antenna device 600 of FIGS. 13 to 16) with an isolator (e.g., the isolator 525 of FIG. 16).

Comparison between FIGS. 19 and 20 reveals that as the isolator 525 according to various embodiments is disposed, more radiation power P is distributed along the orientation of a first radiation patch 521*a* or the radiation direction R while interference or induction I is suppressed in another first radiation patch 521*a*. For example, according to various embodiments of the disclosure, the antenna device 600 may include the isolator 525, thereby presenting an enhanced degree of isolation between radiation conductors (e.g., the first radiation patches 521*a*) and enhanced radiation efficiency. In various embodiments, the antenna device 600 may include the isolator 525, thereby suppressing antenna performance deviation (e.g., radiation power deviation) depending on orientations during beam tilting using phase difference feeding and enhancing beam tilting performance. This is described with reference to FIGS. 23 and 24.

Figure 21:
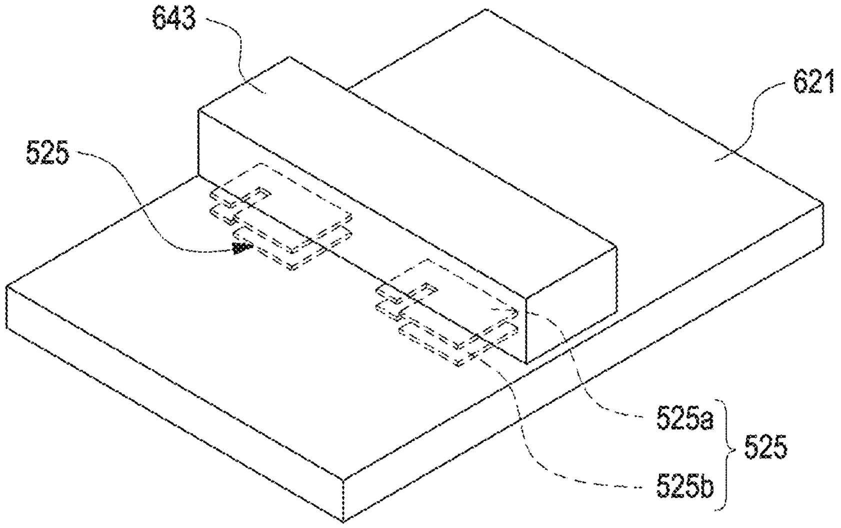
FIG. 21 is a perspective view illustrating an example in which an isolator is disposed in an antenna device according to various embodiments.
Figure 22:
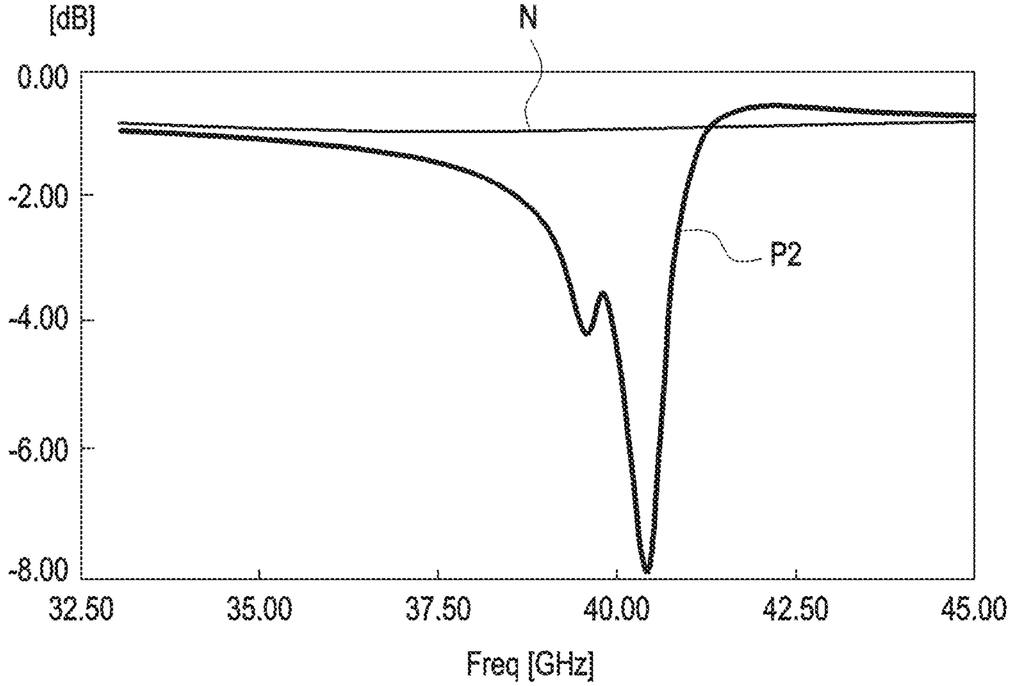
FIG. 22 is a graph illustrating isolation characteristics measured between radiation patches in the antenna device of FIG. 21 according to various embodiments.

FIG. 21 is a perspective view illustrating an example in which an isolator 525 is disposed in an antenna device (e.g., the antenna device 600 of FIGS. 14,15 and 16) according to various embodiments. FIG. 22 is a graph illustrating isolation characteristics measured between radiation patches (e.g., the first radiation patches 521*a* of FIG. 16) in the antenna device 600 of FIG. 21 according to various embodiments.

Referring to FIG. 21, a plurality of isolators 525 may be disposed in an area between two adjacent radiation patches (e.g., the first radiation patches 521*a* of FIG. 16). As described above in connection with FIGS. 9, 10, 11 and 12, the first conductive pad 525*a* and second conductive pad 525*b* of the isolator 525 may be implemented in various shapes and may be implemented to have the external size (e.g., the first or second length L1 or L2 of FIG. 9 or 12) reduced as compared with the electrical length. Although in the instant example, two isolators 525 are disposed in a position or area corresponding to the barrier 643, various embodiments of the disclosure are not limited thereto. Various numbers of isolators 525 may be disposed corresponding to one barrier 643 depending on the external size of the isolator (e.g., the first conductive pad 525*a* and/or the second conductive pad 525*b*) actually manufactured.

Referring to FIG. 22, the graph indicated with 'N' denotes the transmission coefficient before an isolator 525 is disposed, and the graph indicated with 'P2' denotes the results of measurement of the transmission coefficient S21 when two isolators 525 are disposed. It may be identified that the placement of the plurality of isolators 525 may enhance transmission coefficient S21 up to about 41.25 GHz as compared with the structure in which the isolator 525 is not disposed. As such, as at least one isolator 525 is disposed in an area between two adjacent radiation patches (e.g., the first radiation patches 521*a*), the degree of isolation between the radiation patches may be enhanced, and the antenna device 600 may secure stable operation performance. In various embodiments, the shape or number of isolators 525 may vary, and frequency bands in which the degree of isolation is enhanced or how much the degree of isolation is enhanced (e.g., the degree of enhancement of the transmission coefficient S21) may be diversified depending on the shape or number of isolators 525. For example, it should be noted that various embodiments of the disclosure are not limited to the illustrated values or graphs.

Figure 23:
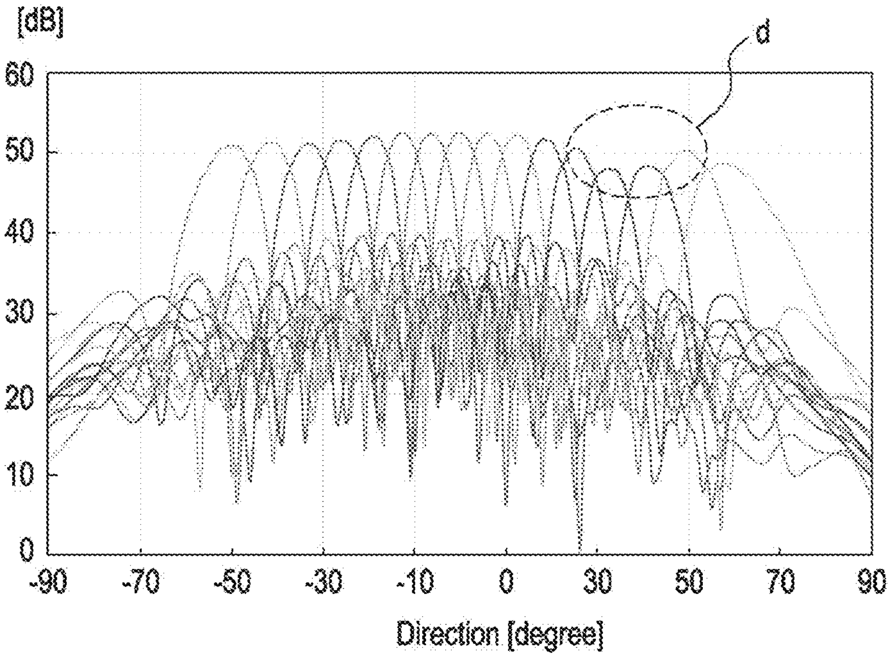
FIG. 23 is a graph illustrating beam tilting performance measured before an isolator is disposed in an antenna device according to various embodiments.
Figure 24:
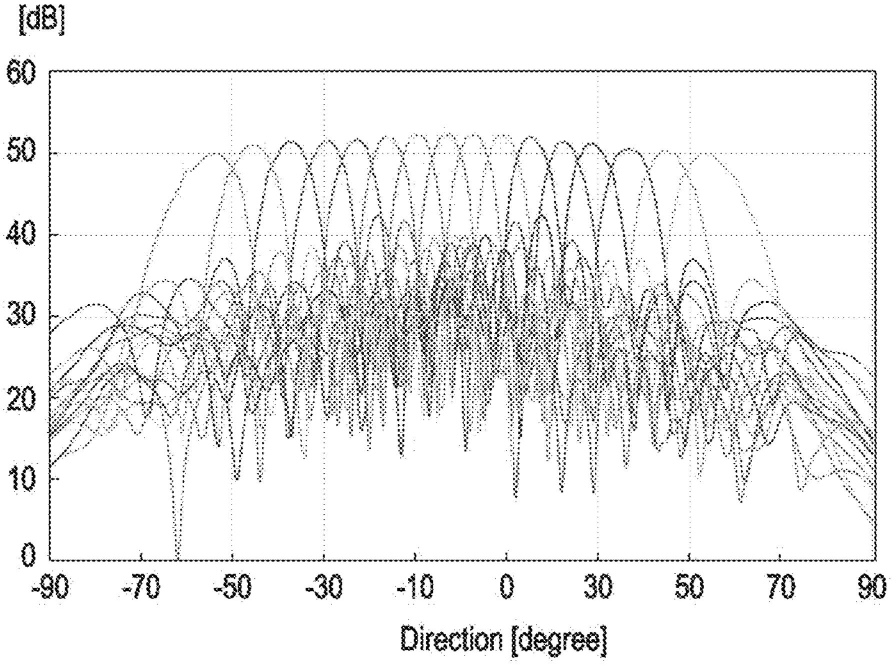
FIG. 24 is a graph illustrating beam tilting performance measured for an antenna device according to various embodiments.

FIG. 23 is a graph illustrating beam tilting performance measured before an isolator 525 is disposed in an antenna device (e.g., the antenna device 600 of FIGS. 14 to 16) according to various embodiments. FIG. 24 is a graph illustrating beam tilting performance measured for an antenna device (e.g., the antenna device 600 of FIGS. 14 to 16) according to various embodiments.

FIGS. 23 and 24 illustrate examples results of measurement of radiation power in an oriented direction or radiation direction upon performing beam tilting via phase difference feeding in an antenna device 600. In general, the antenna device 600 may perform beam tilting in a designated angular range (e.g., about +/−50-degree angular range). Various angular ranges of such beam tilting may be designed considering the environment of the area or space in which the antenna device 600 is to be actually disposed.

According to various embodiments, as illustrated in FIG. 23, it may be identified that when an antenna device without the isolator 525 performs beam tilting in an angular direction from about +30 degrees to about +50 degrees, radiation power is lowered or degraded (d) as compared with other angular directions. For example, in a situation where the isolator 525 is not disposed, the radiation performance of the antenna device may cause a deviation or distortion depending on the oriented direction. In various embodiments, when the antenna device is placed as a relay device of a mobile communication base station, if the radiation performance causes deviation, distortion, or degradation (d) depending on the oriented direction, the communication quality may vary depending on the placement of the antenna device although it is positioned the same distance away from the base station. It may be identified from FIG. 24 that according to various embodiments, the antenna device 600 includes the isolator 525 to reduce deviation or distortion of radiation performance depending on the oriented direction or radiation direction. For example, in an entire angular range for beam tilting as designed, the antenna device 600 may provide a uniform and stable communication environment. For example, according to various embodiments of the disclosure, when the antenna device 600 is provided as a relay device, at least if it is located in the same distance, the antenna device 600 may be prevented from deviations in communication quality depending on directions while providing a stable communication environment.

Figure 25:
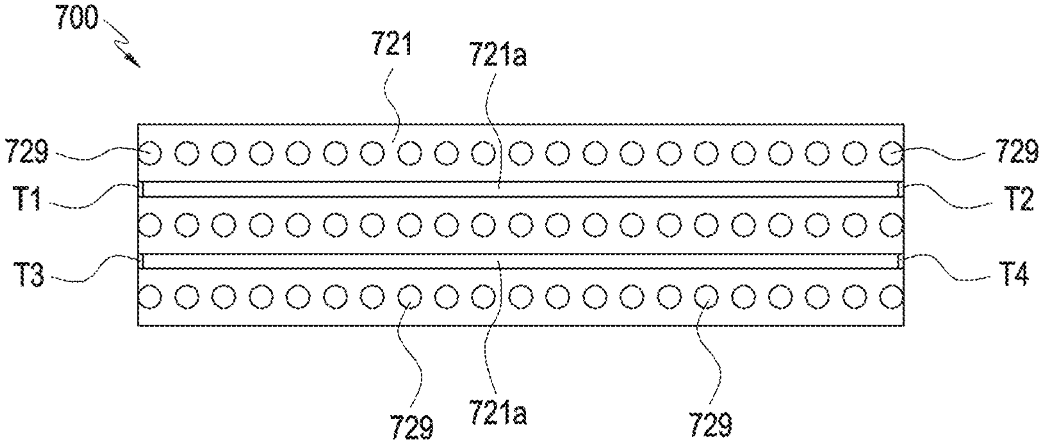
FIG. 25 is a diagram illustrating an example of a line unit for providing a feeding signal in an antenna device according to various embodiments.
Figure 26:
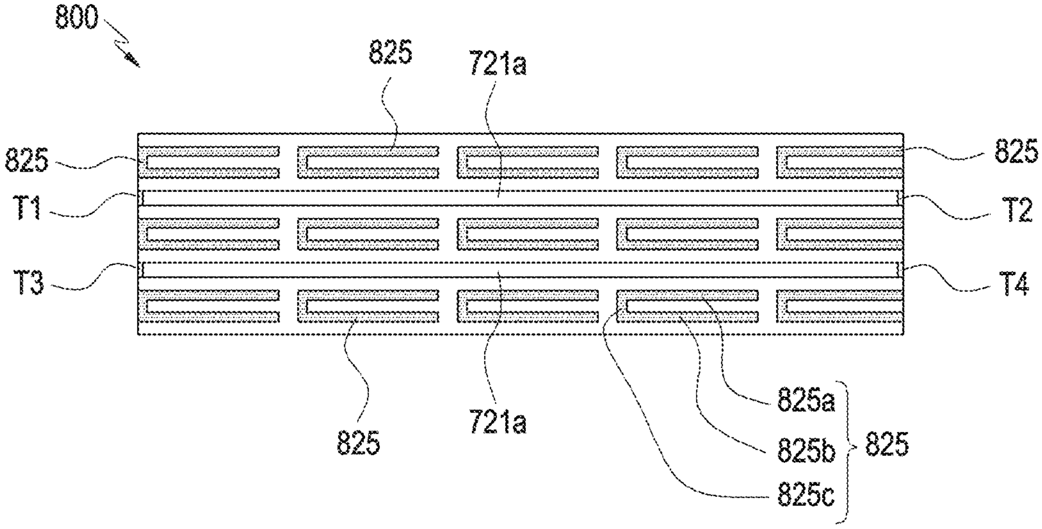
FIG. 26 is a diagram illustrating an example of a line unit for providing a feeding signal in an antenna device according to various embodiments.
Figure 27:
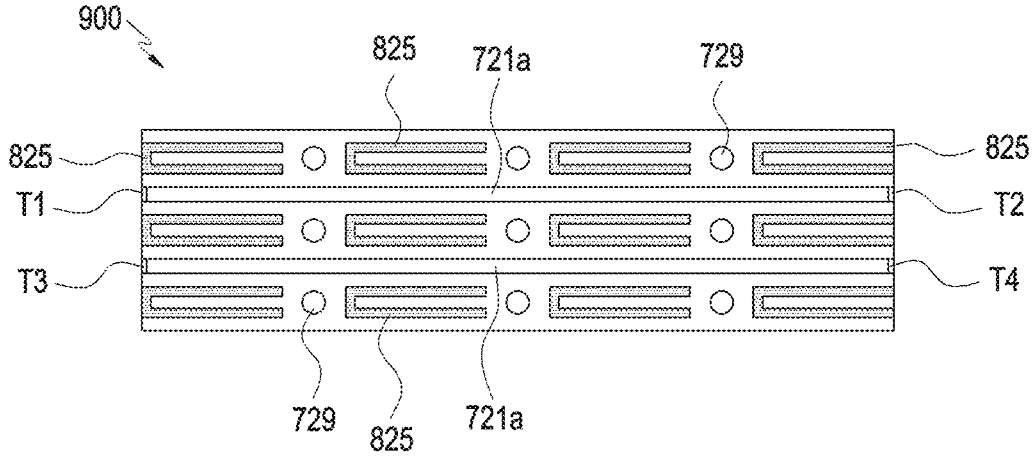
FIG. 27 is a diagram illustrating an example of a line unit for providing a feeding signal in an antenna device according to various embodiments.

FIG. 25 is a diagram illustrating an example of a line unit 700 for providing a feeding signal in an antenna device (e.g., the antenna module 197, 461, 463, or 465 of FIGS. 1, 5, 6 and 7, and/or FIGS. 14, 15 and 16, or the antenna device 500 or 600) according to various embodiments. FIG. 26 is a diagram illustrating an example of a line unit 800 or providing a feeding signal in an antenna device 500 or 600 according to various embodiments. FIG. 27 is a diagram illustrating an example of a line unit 900 for providing a feeding signal in an antenna device 500 or 600 according to various embodiments.

According to various embodiments, an antenna device 500 or 600 may include a line unit 700, 800, or 900 to provide feeding signals to radiation patches (e.g., the radiation patches 521*a* of FIG. 6 or 16) and/or radiation conductors (e.g., the radiation conductors 521*b* of FIG. 6). In pre-4G wireless communication, a line unit for providing feeding signals may be provided in the form of coaxial cables. In post-5G wireless communication, since radiation patches and/or radiation conductors are manufactured in a size less than a few millimeters and are arrayed at intervals smaller than the size, the line unit 700, 800, or 900 may be provided in the form of a printed circuit pattern (e.g., microstrip lines).

According to various embodiments, in a fairly dense structure in which radiation patches and/or radiation conductors are sized and arrayed in less than a few millimeters, lines for transmitting ultra-high frequency signals (e.g., signals of a few tens of GHz band) may be arranged to be at least partially adjacent to each other. If the lines for transmitting ultra-high frequency signals are arranged, an isolation structure may be provided between the transmission lines, and the above-described isolator (e.g., the isolator 525 of FIG. 6, 8, or 16) may be at least a portion of the isolation structure provided between the transmission lines. In various embodiments, these transmission lines may provide feeding signals to the above-described radiation patches or radiation conductors. For example, in the above-described antenna device 500 or 600, the radiation patches and/or radiation conductors may receive feeding signals through the line unit 700, 800, or 900 of FIGS. 25, 26 and 27.

Referring to FIG. 25, the line unit 700 may include a plurality of transmission lines 721*a* extending in parallel and adjacent to each other and an isolation structure disposed in an area between two adjacent transmission lines 721*a*. In an embodiment, the isolation structure may be formed with a plurality of via conductors 729 arranged along the direction in which the transmission lines 721*a* extend. In an embodiment, the transmission lines 721*a* may be configured to provide feeding signals to the above-described first radiation patches or radiation conductors (e.g., the radiation patches 521*a* or radiation conductors 521*b* of FIG. 6 or FIG. 16). In various embodiments, the transmission lines 721*a* may be implemented as microstrip lines formed on or inside the substrate 721 and may include input terminals T1 and T3 and output terminals T2 and T4 at both ends thereof.

According to various embodiments, the isolation structure using an array of via conductors 729 may not be measured for a critical change in transmission coefficient S41 depending on frequency differences although there is a deviation of about 5 dB to about 10 dB depending on frequency bands. For example, the isolation structure using an array of via conductors 729 may have a relatively uniform and good shielding or isolation performance in the measurement frequency band (e.g., about 30 GHz to about 50 GHz). In various embodiments, the shielding or isolation performance of the isolation structure using an array of via conductors 729 may vary substantially depending on the intervals between the via conductors 729. For example, when the via conductors have an interval less than about 1 mm, a shielding performance of about −30 dB or more was measured in the entire measurement frequency band.

Referring to FIG. 26, the line unit 800 may include a plurality of isolators 825, thereby providing an isolation structure between the transmission lines 721*a*. In an embodiment, the isolators 825 may be arranged, along the direction in which the transmission lines 721*a* extend, in an area between two adjacent transmission lines 721*a*. In various embodiments, the isolator 825 may include a first extension portion 825*a*, a second extension portion 825*b*, and/or a connection portion 825*c* electrically connecting the first extension portion 825*a* and the second extension portion 825*b*. In an embodiment, the first extension portion 825*a* may extend in parallel with two adjacent transmission lines 721*a*, and the second extension portion 825*b* may be disposed in an area between one of two adjacent transmission lines 721*a* and the first extension portion 825*a*. The second extension portion 825*b* may extend substantially in parallel with the first extension portion 825*a* and may be electrically connected to the first extension portion 825*a* through the connection portion 825*c*.

According to various embodiments, the first extension portion 825*a* may be similar to the first conductive pad 525*a* of FIG. 8 or 13, and the second extension portion 825*b* may be similar to the second conductive pad 525*b* of FIG. 8 or 13. For example, when an ultra-high frequency signal is transmitted through at least one of the transmission lines 721*a*, the first extension portion 825*a* and the second extension portion 825*b* may generate current flows having a phase difference of 180 degrees with respect to each other. For example, when an ultra-high frequency signal is transmitted through at least one of the transmission lines 721*a*, the electromagnetic field formed around the transmission line 721*a* may be substantially absorbed by the isolator 825 without interfering with the other transmission line 721*a*.

According to various embodiments, in the substrate 721, the isolators 825 may be positioned on the layer where the transmission lines 721*a* (e.g., microstrip lines) are disposed. For example, the isolators 825 may be formed substantially simultaneously with the transmission lines 721*a* in a process of substantially forming the transmission lines 721*a* through plating, deposition, and etching. In an embodiment, the line unit 700 of FIG. 25 includes an isolation structure using via conductors 729, providing superior shielding or isolation characteristics in a wider frequency band as compared with the line unit 800 of FIG. 26. As described below, the isolation structure using the isolators 825 of FIG. 26 may provide a degree of shielding or isolation of about −37.5 dB in about 1.5 GHz bandwidth centered on about 38.5 GHz. In general, an antenna device or a line unit may perform communication using radio signals in a designated frequency band and, in this case, an isolation structure may be designed considering the corresponding frequency band. In various embodiments, the line unit 700 including the isolation structure of FIG. 25 has good isolation performance irrespective of the frequency band but, when compared to the line unit 700 of FIG. 25, the line unit 800 of FIG. 26 may be easy to manufacture while providing good isolation performance in a desired frequency band and saving manufacturing costs. For example, according to various embodiments of the disclosure, the antenna devices 500 and 600 and/or the line unit 800 may be easily manufactured while having good isolation performance in a desired frequency band.

Referring to FIG. 27, the line unit 900 may further include second isolators (e.g., the via conductors 729 of FIG. 25). The second isolators 729 may be disposed, e.g., in an area between two adjacent transmission lines 721*a* and may be disposed between the isolators 825. For example, along the direction in which the transmission line 721*a* extends, the isolators 825 and the second isolators 729 may be alternately disposed. According to an embodiment, the second isolators 729 may include via conductors formed in the substrate 721 and may extend in a direction crossing the direction in which the transmission lines 721*a* extend. Various combinations using the shape or arrangement of the isolators 825 and 729 may facilitate tuning to a desired frequency band in securing a degree of isolation between the transmission lines 721*a*. This is further described in greater detail below with reference to FIG. 28.

Figure 28:
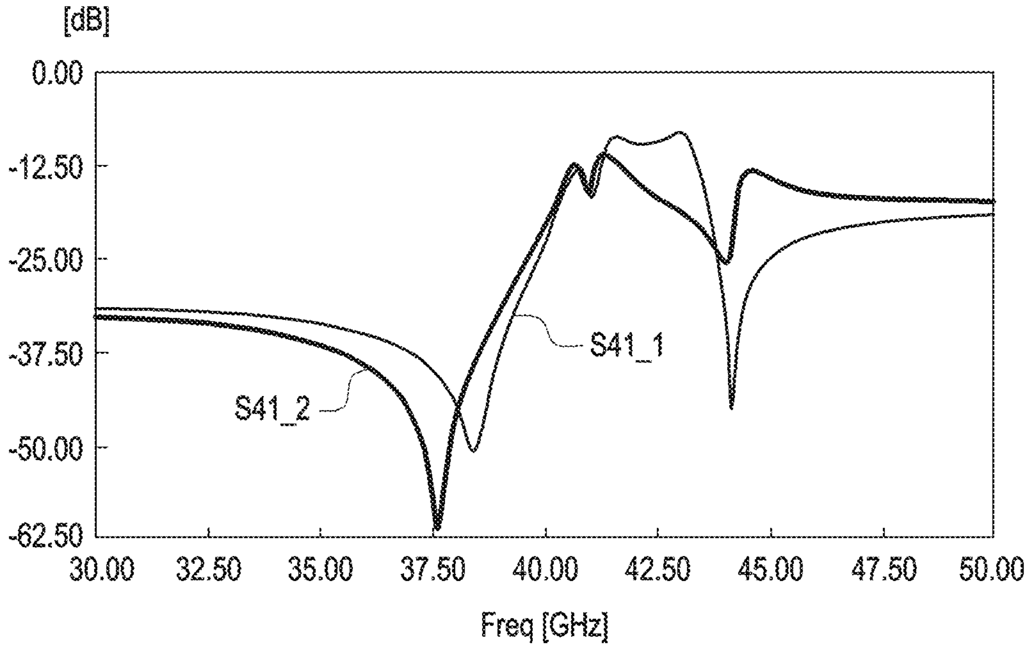
FIG. 28 is a graph illustrating isolation characteristics of line units measured for an antenna device according to various embodiments.

FIG. 28 is a graph illustrating isolation characteristics of line units (e.g., the line units 800 and 900 of FIGS. 26 and 27) measured for an antenna device (e.g., the antenna device 500 or 600 of FIG. 6 or 16) according to various embodiments.

Referring to FIG. 28, 'S41_1' is an example of the transmission coefficient between transmission lines 721*a* in the line unit 800 of FIG. 26, and 'S41_2' is an example of the transmission coefficient between transmission lines 721*a* in the line unit 900 of FIG. 27. As illustrated in FIG. 28, according to various embodiments, it may be identified that the line units 800 and 900 exhibit good isolation characteristics in a frequency range from about 35 GH to about 39 GHz and that the cutoff frequency is varied depending on combinations of the isolators 825 and 729. For example, based on the transmission coefficient of −37.5 dB, the line unit 800 of FIG. 26 may block electromagnetic energy interference between transmission lines 721*a* in about 2 GHz bandwidth centered on about 38.5 GHz. For example, based on the transmission coefficient of −37.5 dB, the line unit 900 of FIG. 27 may block electromagnetic energy interference between transmission lines 721*a* in about 3 GHz bandwidth centered on about 37.5 GHz. For example, it is possible to secure stable isolation characteristics between transmission lines 721*a* in a desired frequency band using combinations of via conductor-type isolators 729 and planar isolators 825 or the size or shape of the isolators 825 and 729.

According to various example embodiments of the disclosure, an antenna device (e.g., the antenna module 197, 461, 463, or 465 of FIG. 1, 6, and/or 16, or the antenna device 500 or 600) and/or an electronic device (e.g., the electronic device 101, 102, 104, 200, 300, or 400 of FIGS. 1 to 5) including the same comprise: a first antenna array (e.g., the antenna array 502 or 602 of FIG. 6 or 16) including an array of a plurality of first radiation patches (e.g., the radiation patches 521*a* of FIG. 6 or 16), a communication circuit (e.g., the processor 120 or communication module 190 of FIG. 1) configured to transmit and/or receive a radio signal using at least one of the first radiation patches, and at least one first isolator (e.g., the isolator 525 of FIG. 6, 8, or 16) comprising a conductor disposed in an area between two adjacent first radiation patches among the first radiation patches. The first isolator may include: a first portion (e.g., the first conductive pad 525*a* of FIG. 6 or 8), a second portion (e.g., the second conductive pad 525*b* of FIG. 6 or 8) disposed in parallel with the first portion, and a third portion (e.g., the connecting conductor 525*c* of FIG. 8) electrically connecting the first portion with the second portion. The first portion and the second portion may be configured to generate current flows having a phase difference of 180 degrees with respect to each other.

According to various example embodiments, the antenna device is configured to generate a first current flow towards where the third portion is connected in one of the first portion and the second portion, and to generate a second current flow away from where the third portion is connected in the other of the first portion and the second portion.

According to various example embodiments, the first isolator may be configured to block electromagnetic interference between the two adjacent first radiation patches.

According to various example embodiments, the antenna device may further comprise: a second antenna array (e.g., the second antenna array 603 of FIGS. 14 to 16) including an array of a plurality of second radiation patches (e.g., the second radiation patches 631*a* of FIG. 16) disposed to face the first antenna array, and a mesh plate (e.g., the mesh plate 604 of FIGS. 14 to 16) disposed between the first antenna array and the second antenna array.

According to various example embodiments, the mesh plate may include an array of a plurality of cavities (e.g., the cavities 641 of FIG. 16) and a barrier (e.g., the barrier 643 of FIG. 16) formed between two adjacent cavities. The second radiation patches may be disposed to face any one of the first radiation patches through any one of the cavities. The barrier may be disposed to face the first isolator.

According to various example embodiments, the mesh plate may be configured to block electromagnetic interference between the two adjacent first radiation patches or between the two adjacent second radiation patches.

According to various example embodiments, the first isolator may include a flat plate-shaped first conductive pad (e.g., the first conductive pad 525*a* of FIG. 8) forming the first portion, a flat plate-shaped second conductive pad (e.g., the second conductive pad 525*b* of FIG. 8) forming the second portion and disposed to face the first conductive pad, and a connecting conductor (e.g., the first connecting conductor 525*c* of FIG. 8) forming the third portion and disposed between the first conductive pad and the second conductive pad. The connecting conductor may electrically connect the first conductive pad with the second conductive pad as an end of the connecting conductor is connected to the first conductive pad, and another end of the connecting conductor is connected to the second conductive pad.

According to various example embodiments, the first isolator further may include at least one first slot (e.g., the slots 525*d* and 525*e* of FIGS. 8 to 11) extending from an edge portion of the first conductive pad to an inside of the first conductive pad, and at least one second slot (e.g., the slots 525*d* and 525*e* of FIGS. 8 to 11) extending from an edge portion of the second conductive pad to an inside of the second conductive pad. The second slot may be disposed to face the first slot.

According to various example embodiments, the antenna device and/or the electronic device may further comprise a plurality of radiation conductors (e.g., the radiation conductors 521*b* of FIG. 6) disposed around the first radiation patches. The first isolator may be further disposed in an area between two adjacent radiation conductors or in an area between one of the plurality of first radiation patches and one of the radiation conductors adjacent thereto.

According to various example embodiments, the radiation conductors may be configured to radiate a radio signal in a direction crossing a direction in which the first radiation patches radiate a radio signal.

According to various example embodiments, the antenna device and/or the electronic device may further comprise: a plurality of transmission lines (e.g., the transmission lines 721*a* of FIG. 26 or 27) configured to provide a feeding signal to the first radiation patches, and at least one second isolator (e.g., the isolators 825 of FIG. 26 or 27) disposed in an area between two adjacent transmission lines among the transmission lines. The second isolator may include a first extension portion (e.g., the first extension portion 825*a* of FIG. 26) extending in parallel with the two adjacent transmission lines, a second extension portion (e.g., the second extension portion 825*b* of FIG. 26) extending in parallel with the first extension portion and disposed between one of the two adjacent transmission lines and the first extension portion, and a connection portion (e.g., the connection portion 825*c* of FIG. 26) electrically connecting the first extension portion with the second extension portion. The first extension portion and the second extension portion may be configured to generate current flows having a phase difference of 180 degrees with respect to each other.

According to various example embodiments, the antenna device and/or the electronic device may further comprise: a plurality of third isolators (e.g., the second isolators 729 of FIG. 27) disposed in an area between the two adjacent transmission lines. The at least one second isolator and the plurality of third isolators may be alternately arranged along a direction in which the transmission lines extend.

According to various example embodiments, the third isolators may include a via conductor extending in a direction crossing a direction in which the transmission lines extend.

According to various example embodiments of the disclosure, an electronic device (e.g., the electronic device 101, 102, 104, 200, 300, or 400 of FIGS. 1 to 5) comprises: a housing (e.g., the housing 210 of FIG. 2) and at least one antenna module (e.g., the antenna module 197, 461, 463, or 465 of FIG. 1, 4, 6, and/or 16, or the antenna device 500 or 600) disposed in the housing. The antenna module may include a first antenna array (e.g., the antenna array 502 or 602 of FIG. 6 or 16) including an array of a plurality of first radiation patches (e.g., the radiation patches 521*a* of FIG. 6 or 16), a communication circuit (e.g., the processor 120 or communication module 190 of FIG. 1) configured to transmit and/or receive a radio signal using at least one of the first radiation patches, and at least one first isolator (e.g., the isolator 525 of FIG. 6, 8, or 16) comprising a conductor disposed in an area between two adjacent first radiation patches among the first radiation patches. The first isolator may include a first portion (e.g., the first conductive pad 525*a* of FIG. 6 or 8), a second portion (e.g., the second conductive pad 525*b* of FIG. 6 or 8) disposed in parallel with the first portion, and a third portion (e.g., the connecting conductor 525*c* of FIG. 8) electrically connecting the first portion with the second portion. The first portion and the second portion may be configured to generate current flows having a phase difference of 180 degrees with respect to each other.

According to various example embodiments, the first isolator may include a flat plate-shaped first conductive pad (e.g., the first conductive pad 525*a* of FIG. 6 or 8) forming the first portion, a flat plate-shaped second conductive pad (e.g., the second conductive pad 525*b* of FIG. 6 or 8) forming the second portion and disposed to face the first conductive pad, and a connecting conductor (e.g., the connecting conductor 525*c* of FIG. 6) disposed between the first conductive pad and the second conductive pad. The connecting conductor may electrically connect the first conductive pad with the second conductive pad as an end of the connecting conductor is connected to the first conductive pad, and another end of the connecting conductor is connected to the second conductive pad.

According to various example embodiments, the first isolator further may include at least one first slot (e.g., the slots 525*d* and 525*e* of FIGS. 8 to 11) extending from an edge portion of the first conductive pad to an inside of the first conductive pad, and at least one second slot (e.g., the slots 525*d* and 525*e* of FIGS. 8 to 11) extending from an edge portion of the second conductive pad to an inside of the second conductive pad. The second slot may be disposed to face the first slot.

According to various example embodiments, the antenna module may further comprise: a plurality of radiation conductors (e.g., the radiation conductors 521*b* of FIG. 6) disposed around the first radiation patches. The first isolator may be further disposed in an area between two adjacent radiation conductors or in an area between one of the plurality of first radiation patches and one of the radiation conductors adjacent thereto.

According to various example embodiments, the radiation conductors may be configured to radiate a radio signal in a direction crossing a direction in which the first radiation patches radiate a radio signal.

According to various example embodiments, the antenna module may include a multi-layer circuit board. In the multi-layer circuit board, one of the first portion and the second portion may be disposed on a same layer as the first radiation patch.

According to various example embodiments, the antenna module may further include a plurality of radiation conductors disposed on the multi-layer circuit board, around the first radiation patches.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the following claims and their equivalents.

What is claimed is:

1. An antenna device, comprising:

a first antenna array including an array of a plurality of first radiation patches;

a communication circuit configured to transmit and/or receive a radio signal using at least one of the first radiation patches; and at least one first isolator, each of the at least one first isolator comprising:

a first conductive portion including at least one first slot;

a second conductive portion disposed in parallel with the first conductive portion and including at least one second slot; and a third conductive portion electrically connecting the first conductive portion with the second conductive portion, and wherein the first conductive portion and the second conductive portion are configured to generate current flows having a phase difference of 180 degrees with respect to each other, and wherein one or more of the at least one first isolator is disposed in an area between two adjacent first radiation patches.

2. The antenna device of claim 1, wherein the antenna device is configured to generate a first current flow in each first isolator toward a first connection point at which the third conductive portion is connected to in one of the first conductive portion and the second conductive portion, and to generate a second current flow away from a second connection point at which the third conductive portion is connected to the other of the first conductive portion and the second conductive portion.

3. The antenna device of claim 1, wherein the one or more of the at least one first isolator is configured to block electromagnetic interference between the two adjacent first radiation patches.

4. The antenna device of claim 1, further comprising:
a second antenna array including an array of a plurality of second radiation patches, the second antenna array being disposed to face the first antenna array; and
a mesh plate disposed between the first antenna array and the second antenna array.

5. The antenna device of claim 4, wherein the mesh plate includes an array comprising a plurality of cavities and a barrier formed between two adjacent cavities,
wherein each second radiation patch is are disposed to face a corresponding one of the first radiation patches through one of the cavities, and
wherein the barrier is disposed to face the one or more the at least one first isolator.

6. The antenna device of claim 4, wherein the mesh plate is configured to block electromagnetic interference between the two adjacent first radiation patches or between two adjacent second radiation patches.

7. The antenna device of claim 1, wherein each of the at least one first isolator includes:
a flat plate-shaped first conductive pad forming the first conductive portion;
a flat plate-shaped second conductive pad forming the second conductive portion and disposed to face the first conductive pad; and
a connecting conductor forming the third conductive portion and disposed between the first conductive pad and the second conductive pad,
wherein the connecting conductor electrically connects the first conductive pad with the second conductive pad and a first end of the connecting conductor is connected to the first conductive pad, and a second end of the connecting conductor is connected to the second conductive pad.

8. The antenna device of claim 7, wherein:
each of the at least one first slot extends from an edge portion of the first conductive pad toward an inside of the first conductive pad; and
each of the at least one second slot extends from an edge portion of the second conductive pad toward an inside of the second conductive pad, wherein each second slot is disposed to face a corresponding first slot.

9. The antenna device of claim 1, further comprising a plurality of radiation conductors disposed around the first radiation patches, and
wherein an additional one or more of the at least one first isolator is disposed in an area between one of the plurality of first radiation patches and one of the radiation conductors disposed adjacent to the one of the plurality of first radiation patches.

10. The antenna device of claim 9, wherein the radiation conductors are configured to radiate a radio signal in a direction crossing a direction in which the first radiation patches radiate a radio signal.

11. The antenna device of claim 1, further comprising:
a plurality of transmission lines configured to provide a feeding signal to the first radiation patches; and
at least one second isolator disposed in an area between two adjacent transmission lines among the transmission lines, wherein each second isolator includes:
a first extension portion extending in parallel with the two adjacent transmission lines;
a second extension portion extending in parallel with the first extension portion and disposed between one of the two adjacent transmission lines and the first extension portion; and
a connection portion electrically connecting the first extension portion with the second extension portion, and
wherein the first extension portion and the second extension portion are configured to generate current flows having a phase difference of 180 degrees with respect to each other.

12. The antenna device of claim 11, further comprising a plurality of third isolators disposed in an area between the two adjacent transmission lines,
wherein the at least one second isolator and the plurality of third isolators are alternately arranged along a direction in which the transmission lines extend.

13. The antenna device of claim 12, wherein the third isolators include a via conductor extending in a direction crossing a direction in which the transmission lines extend.

14. An electronic device, comprising:
a housing; and
at least one antenna module disposed in the housing, the antenna module including:
a first antenna array including an array of a plurality of first radiation patches;
a communication circuit configured to transmit and/or receive a radio signal using at least one of the first radiation patches; and
at least one first isolator, each of the at least one first isolator comprising:
a first conductive portion including at least one first slot;
a second conductive portion disposed in parallel with the first conductive portion and including at least one second slot; and
a third conductive portion electrically connecting the first conductive portion with the second conductive portion, and
wherein the first conductive portion and the second conductive portion are configured to generate current flows having a phase difference of 180 degrees with respect to each other, and
wherein one or more of the at least one first isolator is disposed in an area between two adjacent first radiation patches.

15. The electronic device of claim 14, wherein the antenna module includes a multi-layer circuit board, and wherein, in the multi-layer circuit board, one of the first conductive portion and the second conductive portion of each of the at least one first isolator is disposed on a same layer as the first radiation patches.

16. An electronic device comprising the antenna device of claim 1.

17. The antenna device of claim 1, wherein the first conductive portion and the second conductive portion of each of the at least one first isolator are substantially a same size and shape.

18. The antenna device of claim 1, wherein each second slot is disposed to face a corresponding first slot.

19. The antenna device of claim 1, wherein the first conductive portion is disposed on a first surface of a substrate and the second conductive portion is disposed on a second surface of the substrate.

* * * * *